United States Patent
Miao et al.

(10) Patent No.: US 10,536,255 B2
(45) Date of Patent: Jan. 14, 2020

(54) COMMUNICATIONS METHOD AND DEVICE FOR MULTI-CARRIER AGGREGATION

(71) Applicant: Huawei Technologies Co., Ltd., Shenzhen (CN)

(72) Inventors: Jinhua Miao, Beijing (CN); Wei Quan, Beijing (CN); Bingzhao Li, Beijing (CN); Xiaodong Yang, Shenzhen (CN); Zhenxing Hu, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 15/664,963

(22) Filed: Jul. 31, 2017

(65) Prior Publication Data

US 2017/0331610 A1    Nov. 16, 2017

Related U.S. Application Data

(63) Continuation of application No. PCT/CN2015/071836, filed on Jan. 29, 2015.

(51) Int. Cl.
*H04L 5/00* (2006.01)
*H04W 56/00* (2009.01)
(Continued)

(52) U.S. Cl.
CPC ............ *H04L 5/0098* (2013.01); *H04L 5/001* (2013.01); *H04L 5/0044* (2013.01); *H04W 16/14* (2013.01);
(Continued)

(58) Field of Classification Search
CPC ..... H04L 5/001; H04L 5/0044; H04L 5/0087; H04L 5/0098; H04W 16/14; H04W 16/24;
(Continued)

(56) References Cited

U.S. PATENT DOCUMENTS 9,253,658 B2 * 2/2016 Sadek .................. H04W 52/367
9,532,230 B2 * 12/2016 Bendlin ............. H04W 72/0413
(Continued)

FOREIGN PATENT DOCUMENTS

CA          3020227 A1 * 11/2017 ............ H04W 88/08
CN          102158948 A       8/2011
(Continued)

OTHER PUBLICATIONS

Foreign Communication From a Counterpart Application, Russian Application No. 2017130374, Russian Search Report dated Feb. 14, 2018, 2 pages.
(Continued)

*Primary Examiner* — Eric Nowlin
(74) *Attorney, Agent, or Firm* — Conley Rose, P.C.

(57) ABSTRACT

A communications method and device for multi-carrier aggregation, where the method includes: grouping by a base station, N serving cells into K cell groups, where N is an integer greater than zero, and K is an integer less than N, sending, by the base station, a cell grouping message to user equipment (UE), where the cell grouping message indicates that the N serving cells are grouped into the K cell groups, and communicating, by the base station, with the UE according to the K cell groups. Hence, signaling overheads can be reduced.

19 Claims, 11 Drawing Sheets

A base station groups N serving cells into K cell groups, where N is a positive integer greater than 1, and K is a positive integer less than N — S101

The base station sends a cell grouping message to UE, where the cell grouping message is used to indicate that the N serving cells are grouped into the K cell groups — S102

The base station communicates with the UE according to the K cell groups — S103

(51) Int. Cl.

| | | |
|---|---|---|
| *H04W 76/28* | (2018.01) | |
| *H04W 16/14* | (2009.01) | |
| *H04W 16/24* | (2009.01) | |
| *H04W 72/04* | (2009.01) | |
| *H04W 76/34* | (2018.01) | |
| *H04W 76/10* | (2018.01) | |

(52) U.S. Cl.
CPC ........... *H04W 16/24* (2013.01); *H04W 56/00* (2013.01); *H04W 72/042* (2013.01); *H04W 72/0453* (2013.01); *H04W 76/10* (2018.02); *H04W 76/28* (2018.02); *H04W 76/34* (2018.02); *H04L 5/0087* (2013.01)

(58) Field of Classification Search
CPC ..... H04W 36/30; H04W 56/00; H04W 72/00; H04W 72/04; H04W 72/0413; H04W 72/06; H04W 72/08; H04W 72/1231; H04W 76/10; H04W 76/28; H04W 76/34
See application file for complete search history.

(56) References Cited

U.S. PATENT DOCUMENTS

| | | | | |
|---|---|---|---|---|
| 9,571,242 | B2* | 2/2017 | Balraj | H04L 5/0032 |
| 9,609,641 | B2* | 3/2017 | Kakishima | H04J 11/00 |
| 9,667,309 | B2* | 5/2017 | Sano | H04W 16/28 |
| 9,888,389 | B2* | 2/2018 | Bendlin | H04W 72/0413 |
| 9,967,890 | B2* | 5/2018 | Li | H04W 72/082 |
| 10,278,137 | B2* | 4/2019 | Dinan | H04W 52/243 |
| 2010/0220674 | A1 | 9/2010 | Fu | |
| 2012/0076126 | A1 | 3/2012 | Yi et al. | |
| 2013/0010763 | A1 | 1/2013 | Chen et al. | |
| 2013/0308480 | A1* | 11/2013 | Wigren | H04B 1/7097 370/252 |
| 2013/0343219 | A1* | 12/2013 | Kronander | H04W 52/243 370/252 |
| 2013/0343297 | A1 | 12/2013 | Dinan | |
| 2014/0036805 | A1* | 2/2014 | Sadek | H04W 52/367 370/329 |
| 2014/0198762 | A1 | 7/2014 | Yang et al. | |
| 2014/0321296 | A1* | 10/2014 | Balraj | H04L 5/0032 370/252 |
| 2015/0245362 | A1* | 8/2015 | Li | H04W 72/082 370/329 |
| 2015/0282133 | A1* | 10/2015 | Kakishima | H04J 11/00 370/329 |
| 2015/0358827 | A1* | 12/2015 | Bendlin | H04W 72/0413 455/454 |
| 2015/0372851 | A1* | 12/2015 | Kakishima | H04W 56/00 370/329 |
| 2016/0191115 | A1* | 6/2016 | Sano | H04W 16/28 375/144 |
| 2016/0345181 | A1* | 11/2016 | Bendlin | H04W 72/0413 |
| 2017/0324455 | A1* | 11/2017 | Soriaga | H04W 76/10 |
| 2018/0035316 | A1* | 2/2018 | Kim | H04L 1/20 |
| 2018/0176790 | A1* | 6/2018 | Bendlin | H04W 72/0413 |
| 2018/0279232 | A1* | 9/2018 | Dinan | H04W 72/0473 |
| 2019/0208536 | A1* | 7/2019 | Li | H04W 16/18 |
| 2019/0246360 | A1* | 8/2019 | Dinan | H04W 72/0473 |

FOREIGN PATENT DOCUMENTS

| | | |
|---|---|---|
| CN | 102164414 A | 8/2011 |
| CN | 102932908 A | 2/2013 |
| CN | 103228044 A | 7/2013 |
| CN | 103260151 A | 8/2013 |
| CN | 103327627 A | 9/2013 |
| CN | 103327646 A | 9/2013 |
| EP | 2408247 A1 | 1/2012 |
| EP | 2684401 A1 * | 1/2014 ........ H04W 52/243 |
| KR | 20180012039 A * | 2/2018 ............ H04L 1/20 |
| RU | 2537692 C2 | 1/2015 |
| WO | 2010123224 A2 | 10/2010 |
| WO | WO-2012125088 A1 * | 9/2012 ........ H04W 52/243 |
| WO | 2014054892 A1 | 4/2014 |
| WO | 2014114261 A1 | 7/2014 |
| WO | WO-2017196604 A1 * | 11/2017 ........... H04W 88/08 |

OTHER PUBLICATIONS

Foreign Communication From a Counterpart Application, Russian Application No. 2017130374, Russian Office Action dated Feb. 15, 2018, 5 pages.
Machine Translation and Abstract of Chinese Publication No. CN102158948, Aug. 17, 2011, 13 pages.
Machine Translation and Abstract of Chinese Publication No. CN103260151, Aug. 21, 2013, 22 pages.
Machine Translation and Abstract of Chinese Publication No. CN103327627, Sep. 25, 2013, 13 pages.
Machine Translation and Abstract of Chinese Publication No. CN103327646, Sep. 25, 2013, 14 pages.
"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.4.0, Technical Specification, Dec. 2014, 60 pages.
Foreign Communication From a Counterpart Application, PCT Application No. PCT/CN2015/071836, English Translation of International Search Report dated Nov. 2, 2015, 2 pages.
Foreign Communication From a Counterpart Application, PCT Application No. PCT/CN2015/071836, English Translation of Written Opinion dated Nov. 2, 2015, 6 pages.
Pantech and Curitel., "Considerations on issues of UE Component Carrier set", 3GPP TSG RAN WG1 Meeting #59, Jeju, Korea, Nov. 9-13, 2009, XP050389081, 6 pages.
Foreign Communication From a Counterpart Application, European Application No. 15879382.8, Extended European Search Report dated Dec. 22, 2017, 9 pages.
Machine Translation and Abstract of Chinese Publication No. CN102164414, Aug. 24, 2011, 15 pages.
Machine Translation and Abstract of Chinese Publication No. CN103228044, Jul. 31, 2013, 23 pages.
Foreign Communication From a Counterpart Application, Chinese Application No. 201580002506.9, Chinese Office Action dated Jan. 2, 2019, 12 pages.
Pantech., et al., "Considerations on issues of UE Component Carrier set," R1-094676, 3GPP TSG RAN WG1 Meeting #59, Nov. 9-13, 2009, 5 pages.
Foreign Communication From a Counterpart Application, Korean Application No. 10-2017-7023875, Korean Office Action dated Jul. 5, 2018, 5 pages.
Foreign Communication From a Counterpart Application, Korean Application No. 10-2017-7023875, English Translation of Korean Office Action dated Jul. 5, 2018, 3 pages.

* cited by examiner

COMMUNICATIONS METHOD AND DEVICE FOR MULTI-CARRIER AGGREGATION

CROSS-REFERENCE TO RELATED APPLICATION

This application is a continuation of International Patent Application No. PCT/CN2015/071836 filed on Jan. 29, 2015, which is hereby incorporated by reference in its entirety.

TECHNICAL FIELD

Embodiments of the present disclosure relate to the field of communications technologies, and in particular, to a communications method and device for multi-carrier aggregation.

BACKGROUND

To satisfy requirements of a downlink peak speed of 1 gigabits per second (Gbps) and an uplink peak speed of 500 megabits per second (Mbps) in Long Term Evolution-Advanced (LTE-A), a maximum transmission bandwidth of 100 megahertz (MHz) needs to be provided. However, because a continuous spectrum of this high transmission bandwidth is rare, a solution of carrier aggregation is proposed in LTE-A. In carrier aggregation, two or more component carriers (CC) are aggregated to support a higher transmission bandwidth (a maximum transmission bandwidth is 100 MHz). Carrier aggregation supports five carriers. In current carrier aggregation, a quantity of carriers may be increased to 32 to form massive carrier aggregation such that more carriers can be supported.

In existing carrier aggregation, a base station controls carriers on a per-carrier basis. If this manner in carrier aggregation continues to be used in massive carrier aggregation, a base station separately controls up to 32 carriers. As a result, signaling overheads are increased.

SUMMARY

Embodiments of the present disclosure provide a communications method and device for multi-carrier aggregation to reduce signaling overheads.

According to a first aspect, an embodiment of the present disclosure provides a communications method for multi-carrier aggregation, including grouping, by a base station, N serving cells into K cell groups, where N is a positive integer greater than one, and K is a positive integer less than N, sending, by the base station, a cell grouping message to user equipment (UE), where the cell grouping message is used to indicate that the N serving cells are grouped into the K cell groups, and communicating, by the base station, with the UE according to the K cell groups.

In a first possible implementation manner of the first aspect, the cell grouping message includes identifiers of the K cell groups, and an identifier of a serving cell included in each of the cell groups, and the cell grouping message is used to indicate that the serving cells corresponding to identifiers of the N serving cells are grouped into the cell groups corresponding to the identifiers of the K cell groups.

With reference to the first aspect or the first possible implementation manner of the first aspect, in a second possible implementation manner of the first aspect, grouping, by a base station, N serving cells into K cell groups includes grouping, by the base station, the N serving cells into the K cell groups according to a quantity K of physical uplink control channels (PUCCHs), where the K cell groups correspond to the K PUCCHs, and each of the cell groups includes a serving cell used to carry the PUCCH.

With reference to the first aspect or the first possible implementation manner of the first aspect, in a third possible implementation manner of the first aspect, grouping, by a base station, N serving cells into K cell groups includes grouping, by the base station, the serving cells into a licensed carrier cell group or an unlicensed carrier cell group according to types of carriers used in the serving cells, where a carrier used in a serving cell included in the licensed carrier cell group is a licensed carrier, and a carrier used in a serving cell included in the unlicensed carrier cell group is an unlicensed carrier.

With reference to the first aspect or the first possible implementation manner of the first aspect, in a fourth possible implementation manner of the first aspect, grouping, by a base station, N serving cells into K cell groups includes grouping, by the base station, the N serving cells into the K cell groups according to a timing advance (TA), where serving cells whose TAs are the same belong to a same cell group.

With reference to the first aspect or the first possible implementation manner of the first aspect, in a fifth possible implementation manner of the first aspect, grouping, by a base station, N serving cells into K cell groups includes grouping, by the base station, the N serving cells into the K cell groups according to signal quality.

With reference to the fifth possible implementation manner of the first aspect, in a sixth possible implementation manner of the first aspect, grouping, by the base station, the N serving cells into the K cell groups according to signal quality includes grouping, by the base station, the N serving cells into a first cell group and a second cell group according to signal quality and a preset threshold, where signal quality of a serving cell included in the first cell group is greater than the preset threshold, and signal quality of a serving cell included in the second cell group is not greater than the preset threshold.

With reference to the first aspect or the first possible implementation manner of the first aspect, in a seventh possible implementation manner of the first aspect, grouping, by a base station, N serving cells into K cell groups includes grouping, by the base station, the N serving cells into the K cell groups according to that serving cells that transmit scheduling commands using a same serving cell and the serving cell that is used to transmit the scheduling commands belong to a same cell group.

With reference to the first aspect or the first possible implementation manner of the first aspect, in an eighth possible implementation manner of the first aspect, grouping, by a base station, N serving cells into K cell groups includes grouping, by the base station, the N serving cells into the K cell groups according to that serving cells whose discontinuous reception (DRX) configuration parameters are the same belong to a same cell group, where the DRX configuration parameter includes at least one of DRX duration, a DRX inactivity timer, a DRX retransmission timer, a long DRX cycle offset, a short DRX cycle, or a DRX short cycle.

With reference to any one of the first aspect or the first to the eighth possible implementation manners of the first aspect, in a ninth possible implementation manner of the first aspect, communicating, by the base station, with the UE according to the K cell groups includes sending, by the base station, a cell group modification message to the UE, where the cell group modification message includes an identifier of a to-be-modified cell group and an identifier of a cell included in a modified cell group, and the to-be-modified cell group is at least one cell group of the K cell groups.

With reference to any one of the first aspect or the first to the eighth possible implementation manners of the first aspect, in a tenth possible implementation manner of the first aspect, communicating, by the base station, with the UE according to the K cell groups includes sending, by the base station, a cell group release message to the UE, where the cell group release message includes an identifier of a to-be-released cell group, and the to-be-released cell group is at least one cell group of the K cell groups.

With reference to any one of the first aspect or the first to the eighth possible implementation manners of the first aspect, in an eleventh possible implementation manner of the first aspect, communicating, by the base station, with the UE according to the K cell groups includes sending, by the base station, a cell group activation message to the UE, where the cell group activation message is used to indicate a to-be-activated cell group, and the to-be-activated cell group is at least one cell group of the K cell groups.

With reference to any one of the first aspect or the first to the eighth possible implementation manners of the first aspect, in a twelfth possible implementation manner of the first aspect, communicating, by the base station, with the UE according to the K cell groups includes sending, by the base station, a cell group activation message to the UE, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs.

With reference to any one of the first aspect or the first to the eighth possible implementation manners of the first aspect, in a thirteenth possible implementation manner of the first aspect, communicating, by the base station, with the UE according to the K cell groups includes sending, by the base station, a cell group deactivation message to the UE, where the cell group deactivation message is used to indicate a to-be-deactivated cell group, and the to-be-deactivated cell group is at least one cell group of the K cell groups.

With reference to any one of the first aspect or the first to the eighth possible implementation manners of the first aspect, in a fourteenth possible implementation manner of the first aspect, communicating, by the base station, with the UE according to the K cell groups includes sending, by the base station, a cell group deactivation message to the UE, where the cell group deactivation message is used to indicate a to-be-deactivated cell group and a to-be-deactivated serving cell in the to-be-activated cell group, the to-be-deactivated cell group is at least one cell group of the K cell groups, and the to-be-deactivated serving cell is at least one serving cell in the cell group to which the to-be-deactivated serving cell belongs.

With reference to the second possible implementation manner of the first aspect, in a fifteenth possible implementation manner of the first aspect, communicating, by the base station, with the UE according to the K cell groups includes receiving, by the base station, a channel quality indicator (CQI) or feedback information, sent by the UE, of at least one downlink channel using an uplink channel used to carry a PUCCH, where a serving cell corresponding to the uplink channel used to carry the PUCCH and a serving cell corresponding to the at least one downlink channel belong to a same cell group, and the feedback information includes acknowledgement (ACK) information or negative acknowledgement (NACK) information.

With reference to the third possible implementation manner of the first aspect, in a sixteenth possible implementation manner of the first aspect, communicating, by the base station, with the UE according to the K cell groups includes communicating, by the base station, with the UE according to a DRX working mode using a serving cell in the licensed cell group, or communicating, by the base station, with the UE according to a working mode in which DRX is not configured and using a serving cell in the unlicensed cell group.

With reference to the eighth possible implementation manner of the first aspect, in a seventeenth possible implementation manner of the first aspect, communicating, by the base station, with the UE according to the K cell groups includes communicating, by the base station, with the UE using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

With reference to any one of the first aspect or the first to the eighth possible implementation manners of the first aspect, in an eighteenth possible implementation manner of the first aspect, communicating, by the base station, with the UE according to the K cell groups includes sending, by the base station, downlink data to the UE using a first serving cell, where the first serving cell is any serving cell of the N serving cells, receiving, by the base station, NACK information sent by the UE, where the NACK information indicates that the UE has not received the downlink data successfully, and sending, by the base station, the downlink data to the UE using a second serving cell.

With reference to any one of the first aspect or the first to the eighth possible implementation manners of the first aspect, in a nineteenth possible implementation manner of the first aspect, communicating, by the base station, with the UE according to the K cell groups includes sending, by the base station, NACK information to the UE when the base station has not successfully received uplink data sent by the UE using a first serving cell, where the NACK information is used to indicate that the base station has not successfully received the uplink data sent by the base station using the first serving cell, and the first serving cell is any serving cell of the N serving cells, and receiving, by the base station, the uplink data sent by the UE using a second serving cell.

With reference to any one of the first aspect or the first to the eighth possible implementation manners of the first aspect, in a twentieth possible implementation manner of the first aspect, communicating, by the base station, with the UE according to the K cell groups includes sending, by the base station, a downlink control indicator (DCI) to the UE using a first serving cell, where the first serving cell is any serving cell of the N serving cells, the DCI is used to instruct the UE to communicate with the base station using a second serving cell, and the first serving cell and the second serving cell belong to a same cell group, and communicating, by the base station, with the UE according to the DCI using the second serving cell.

With reference to any one of the first aspect or the first to the eighth possible implementation manners of the first aspect, in a twenty-first possible implementation manner of the first aspect, communicating, by the base station, with the UE according to the K cell groups includes receiving, by the base station, communication link quality detection results, sent by the UE, of M serving cells in a first cell group, where the first cell group is any cell group of the K cell groups, and M is a positive integer less than a quantity of serving cells in the first cell group, and determining, by the base station, communication link quality of a remaining serving cell in the first cell group according to the communication link quality detection results of the M serving cells.

With reference to the twenty-first possible implementation manner of the first aspect, in a twenty-second possible implementation manner of the first aspect, the communication link quality detection includes one of the following or a combination thereof: whether a downlink channel is out-of-synchronization, whether an uplink channel is out-of-synchronization, a signal to interference plus noise ratio (SINR) of an uplink channel, or a radio link failure.

With reference to the twenty-first possible implementation manner of the first aspect or the twenty-second possible implementation manner of the first aspect, in a twenty-third possible implementation manner of the first aspect, before receiving, by the base station, communication link quality detection results, sent by the UE, of M serving cells in a first cell group, the method further includes sending, by the base station, communication link quality detection instruction information to the UE, where the communication link quality detection instruction information is used to instruct the UE to perform communication link quality detection on communication links of the M serving cells in the first cell group.

With reference to any one of the first aspect or the first to the eighth possible implementation manners of the first aspect, in a twenty-fourth possible implementation manner of the first aspect, communicating, by the base station, with the UE according to the K cell groups includes sending, by the base station, information about M random access channels to the UE, where the M random access channels are respectively random access channels between the UE and M serving cells in a first cell group, the first cell group is any cell group of the K cell groups, and M is a positive integer not greater than a quantity of serving cells in the first cell group, receiving, by the base station, a preamble sent by the UE on a first random access channel according to information about the first random access channel, where the first random access channel is any random access channel of the M random access channels, and sending, by the base station using a first serving cell, a random access response corresponding to the first random access channel to the UE, where the first serving cell is any serving cell in the first cell group.

With reference to the twenty-fourth possible implementation manner of the first aspect, in a twenty-fifth possible implementation manner of the first aspect, the random access response includes uplink scheduling grant information, the uplink scheduling grant information is used to instruct the UE to send uplink information in a second serving cell, and the second serving cell and the first serving cell belong to a same cell group, and the method further includes receiving, by the base station according to the uplink scheduling grant information using the second serving cell, the uplink information sent by the UE.

With reference to any one of the first aspect or the first to the eighth possible implementation manners of the first aspect, in a twenty-sixth possible implementation manner of the first aspect, communicating, by the base station, with the UE according to the K cell groups includes receiving, by the base station, a measurement report sent by the UE, where the measurement report is used to indicate that the UE triggers, in a first cell group to enter a first measurement event, the first cell group is any cell group of the K cell groups, and the first measurement event is any one of measurement events.

According to a second aspect, an embodiment of the present disclosure provides a communications method for multi-carrier aggregation, including receiving, by UE, a cell grouping message sent by a base station, where the cell grouping message is used to indicate that N serving cells are grouped into K cell groups, N is an integer greater than zero, and K is an integer less than N, and communicating, by the UE, with the base station according to the K cell groups.

In a first possible implementation manner of the second aspect, the cell grouping message includes identifiers of the K cell groups, and an identifier of a serving cell included in each of the cell groups, and the cell grouping message is used to indicate that the serving cells corresponding to identifiers of the N serving cells are grouped into the cell groups corresponding to the identifiers of the K cell groups.

With reference to the second aspect or the first possible implementation manner of the second aspect, in a second possible implementation manner of the second aspect, communicating, by the UE, with the base station according to the K cell groups includes receiving, by the UE, a cell group modification message sent by the base station, where the cell group modification message includes an identifier of a to-be-modified cell group and an identifier of a serving cell included in a modified cell group, and the to-be-modified cell group is at least one cell group of the K cell groups, and updating, by the UE, the to-be-modified cell group according to the cell group modification message.

With reference to the second aspect or the first possible implementation manner of the second aspect, in a third possible implementation manner of the second aspect, communicating, by the UE, with the base station according to the K cell groups includes receiving, by the UE, a cell group release message sent by the base station, where the cell group release message includes an identifier of a to-be-released cell group, and the to-be-released cell group is at least one cell group of the K cell groups, and releasing, by the UE, a serving cell in the to-be-released cell group according to the cell group release message.

With reference to the second aspect or the first possible implementation manner of the second aspect, in a fourth possible implementation manner of the second aspect, communicating, by the UE, with the base station according to the K cell groups includes receiving, by the UE, a cell group activation message sent by the base station, where the cell group activation message is used to indicate a to-be-activated cell group, and the to-be-activated cell group is at least one cell group of the K cell groups, and activating, by the UE, a serving cell in the to-be-activated cell group according to the cell group activation message.

With reference to the second aspect or the first possible implementation manner of the second aspect, in a fifth possible implementation manner of the second aspect, communicating, by the UE, with the base station according to the K cell groups includes receiving, by the UE, a cell group activation message sent by the base station, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs, and activating, by the UE, a to-be-activated serving cell in the to-be-activated cell group according to the cell group activation message.

With reference to the second aspect or the first possible implementation manner of the second aspect, in a sixth possible implementation manner of the second aspect, communicating, by the UE, with the base station according to the K cell groups includes receiving, by the UE, a cell group deactivation message sent by the base station, where the cell group deactivation message is used to indicate a to-be-deactivated cell group, and the to-be-deactivated cell group is at least one cell group of the K cell groups, and deactivating, by the UE, a serving cell in the to-be-deactivated cell group according to the cell group deactivation message.

With reference to the second aspect or the first possible implementation manner of the second aspect, in a seventh possible implementation manner of the second aspect, communicating, by the UE, with the base station according to the K cell groups includes receiving, by the UE, a cell group deactivation message sent by the base station, where the cell group deactivation message is used to indicate a to-be-deactivated cell group and a to-be-deactivated serving cell in the to-be-deactivated cell group, the to-be-deactivated cell group is at least one cell group of the K cell groups, and the to-be-deactivated serving cell is at least one serving cell in the cell group to which the to-be-deactivated serving cell belongs, and deactivating, by the UE, a to-be-deactivated serving cell in the to-be-deactivated cell group according to the cell group deactivation message.

With reference to the second aspect or the first possible implementation manner of the second aspect, in an eighth possible implementation manner of the second aspect, communicating, by the UE, with the base station according to the K cell groups includes sending, by the UE, a CQI or feedback information of at least one downlink channel to the base station using an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

With reference to the second aspect or the first possible implementation manner of the second aspect, in a ninth possible implementation manner of the second aspect, when the N serving cells are grouped into a licensed carrier cell group and an unlicensed carrier cell group, a carrier used in a serving cell included in the licensed carrier cell is a licensed carrier, a carrier used in a serving cell included in the unlicensed carrier cell is an unlicensed carrier, and communicating, by the UE, with the base station according to the K cell groups includes communicating, by the UE, with the base station according to a DRX working mode using a serving cell in the licensed carrier cell group, or communicating, by the UE, with the base station according to a working mode in which DRX is not configured and using a serving cell in the unlicensed carrier cell group.

With reference to the second aspect or the first possible implementation manner of the second aspect, in a tenth possible implementation manner of the second aspect, communicating, by the UE, with the base station according to the K cell groups includes communicating, by the UE, with the base station using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

With reference to the second aspect or the first possible implementation manner of the second aspect, in an eleventh possible implementation manner of the second aspect, communicating, by the UE, with the base station according to the K cell groups includes sending, by the UE, NACK information to the base station when the UE has not successfully received downlink data sent by the base station using a first serving cell, where the NACK information indicates that the UE has not successfully received the downlink data, and the first serving cell is any serving cell of the N serving cells, and receiving, by the UE using a second serving cell, the downlink data sent by the base station.

With reference to the second aspect or the first possible implementation manner of the second aspect, in a twelfth possible implementation manner of the second aspect, communicating, by the UE, with the base station according to the K cell groups includes sending, by the UE, uplink data to the base station using a first serving cell, where the first serving cell is any serving cell of the N serving cells, receiving, by the UE, NACK information sent by the base station, where the NACK information is used to indicate that the base station has not successfully received the uplink data, and sending, by the UE, the uplink data to the base station using a second serving cell.

With reference to the second aspect or the first possible implementation manner of the second aspect, in a thirteenth possible implementation manner of the second aspect, communicating, by the UE, with the base station according to the K cell groups includes receiving, by the UE using a first serving cell, DCI sent by the base station, where the first serving cell is any serving cell of the N serving cells, the DCI is used to instruct the UE to communicate with the base station using a second serving cell, and the first serving cell and the second serving cell belong to a same cell group, and communicating, by the UE, with the base station according to the DCI using the second serving cell.

With reference to the second aspect or the first possible implementation manner of the second aspect, in a fourteenth possible implementation manner of the second aspect, communicating, by the UE, with the base station according to the K cell groups includes performing, by the UE, communication link quality detection on communication links of M serving cells in a first cell group, to obtain communication link quality detection results of the M serving cells, where M is a positive integer less than a quantity of serving cells in the first cell group, and the first cell group is any cell group of the K cell groups, and sending, by the UE, the communication link quality detection results of the M serving cells to the base station.

With reference to the second aspect or the first possible implementation manner of the second aspect, in a fifteenth possible implementation manner of the second aspect, the communication link quality detection includes at least one of the following: whether a downlink channel is out-of-synchronization, whether an uplink channel is out-of-synchronization, an SINR of an uplink channel, or a radio link failure.

With reference to the second aspect or the first possible implementation manner of the second aspect, in a sixteenth possible implementation manner of the second aspect, before performing, by the UE, communication link quality detection on communication links of M serving cells in a first cell group, the method further includes receiving, by the UE, communication link quality detection instruction information sent by the base station, where the communication link quality detection instruction information is used to instruct the UE to perform communication link quality detection on the communication links of the M serving cells in the first cell group, and performing, by the UE, communication link quality detection on communication links of M serving cells in a first cell group, to obtain communication link quality detection results of the M serving cells includes performing, by the UE, communication link quality detection on the communication links of the M serving cells in the first cell group according to the communication link quality detection instruction information to obtain the communication link quality detection results of the M serving cells.

With reference to the second aspect or the first possible implementation manner of the second aspect, in a seventeenth possible implementation manner of the second aspect, communicating, by the UE, with the base station according to the K cell groups includes receiving, by the UE, information about M random access channels that is sent by the base station, where the M random access channels are respectively random access channels between the UE and M serving cells in a first cell group, the first cell group is any cell group of the K cell groups, and M is a positive integer not greater than a quantity of serving cells in the first cell group, sending, by the UE, a preamble to the base station on a first random access channel according to information about the first random access channel, where the first random access channel is any random access channel of the M random access channels, and receiving, by the UE using a first serving cell, a random access response that corresponds to the first random access channel and that is sent by the base station, where the first serving cell is any serving cell in the first cell group.

With reference to the seventeenth possible implementation manner of the second aspect, in an eighteenth possible implementation manner of the second aspect, the random access response includes uplink scheduling grant information, the uplink scheduling grant information is used to instruct the UE to send uplink information in a second serving cell, and the second serving cell and the first serving cell belong to a same cell group, and the method further includes sending, by the UE, the uplink information to the base station according to the uplink scheduling grant information using the second serving cell.

With reference to the second aspect or the first possible implementation manner of the second aspect, in a nineteenth possible implementation manner of the second aspect, communicating, by the UE, with the base station according to the K cell groups includes obtaining, by the UE, signal quality of a primary serving cell in the K cell groups and a neighboring cell of the UE, where the primary serving cell is a serving cell that transmits control signaling and that is in a cell group to which the primary serving cell belongs, determining, by the UE, that the UE triggers, in a first cell group, a first measurement event to occur, according to signal quality of a primary serving cell in the first cell group, the signal quality of the neighboring cell of the UE, and a condition that is satisfied so that a measurement event occurs, where triggering the first measurement event to occur includes triggering to enter the first measurement event or triggering to leave the first measurement event, and the first measurement event is any one of measurement events, and when triggering, by the UE in the first cell group, the first measurement event to occur is triggering to enter the first measurement event, sending, by the UE, a measurement report to the base station, where the measurement report is used to indicate that the UE triggers, in the first cell group, to enter the first measurement event.

According to a third aspect, an embodiment of the present disclosure provides a base station, including a processing unit configured to group N serving cells into K cell groups, where N is a positive integer greater than one, and K is a positive integer less than N, and a sending unit configured to send a cell grouping message to UE, where the cell grouping message is used to indicate that the N serving cells are grouped into the K cell groups, where the processing unit is further configured to communicate with the UE according to the K cell groups.

In a first possible implementation manner of the third aspect, the cell grouping message includes identifiers of the K cell groups, and an identifier of a serving cell included in each of the cell groups, and the cell grouping message is used to indicate that the serving cells corresponding to identifiers of the N serving cells are grouped into the cell groups corresponding to the identifiers of the K cell groups.

With reference to the third aspect or the first possible implementation manner of the third aspect, in a second possible implementation manner of the third aspect, when grouping the N serving cells into the K cell groups, the processing unit is further configured to group the N serving cells into the K cell groups according to a quantity K of PUCCHs, where the K cell groups correspond to the K PUCCHs, and each of the cell groups includes a serving cell used to carry the PUCCH.

With reference to the third aspect or the first possible implementation manner of the third aspect, in a third possible implementation manner of the third aspect, when grouping the N serving cells into the K cell groups, the processing unit is further configured to group the serving cells into a licensed carrier cell group or an unlicensed carrier cell group according to types of carriers used in the serving cells, where a carrier used in a serving cell included in the licensed carrier cell group is a licensed carrier, and a carrier used in a serving cell included in the unlicensed carrier cell group is an unlicensed carrier.

With reference to the third aspect or the first possible implementation manner of the third aspect, in a fourth possible implementation manner of the third aspect, when grouping the N serving cells into the K cell groups, the processing unit is further configured to group the N serving cells into the K cell groups according to a TA, where serving cells whose TAs are the same belong to a same cell group.

With reference to the third aspect or the first possible implementation manner of the third aspect, in a fifth possible implementation manner of the third aspect, when grouping the N serving cells into the K cell groups, the processing unit is further configured to group the N serving cells into the K cell groups according to signal quality.

With reference to the fifth possible implementation manner of the third aspect, in a sixth possible implementation manner of the third aspect, when grouping the N serving cells into the K cell groups according to signal quality, the processing unit is further configured to group the N serving cells into a first cell group and a second cell group according to signal quality and a preset threshold, where signal quality of a serving cell included in the first cell group is greater than the preset threshold, and signal quality of a serving cell included in the second cell group is not greater than the preset threshold.

With reference to the third aspect or the first possible implementation manner of the third aspect, in a seventh possible implementation manner of the third aspect, when grouping the N serving cells into the K cell groups, the processing unit is further configured to group the N serving cells into the K cell groups according to that serving cells that transmit scheduling commands using a same serving cell and the serving cell that is used to transmit the scheduling commands belong to a same cell group.

With reference to the third aspect or the first possible implementation manner of the third aspect, in an eighth possible implementation manner of the third aspect, when grouping the N serving cells into the K cell groups, the processing unit is further configured to group the N serving cells into the K cell groups according to that serving cells whose DRX configuration parameters are the same belong to a same cell group, where the DRX configuration parameter includes at least one of DRX duration, a DRX inactivity timer, a DRX retransmission timer, a long DRX cycle offset, a short DRX cycle, or a DRX short cycle.

With reference to any one of the third aspect or the first to the eighth possible implementation manners of the third aspect, in a ninth possible implementation manner of the third aspect, when communicating with the UE according to the K cell groups, the processing unit is further configured to send a cell group modification message to the UE, where the cell group modification message includes an identifier of a to-be-modified cell group and an identifier of a cell included in a modified cell group, and the to-be-modified cell group is at least one cell group of the K cell groups.

With reference to any one of the third aspect or the first to the eighth possible implementation manners of the third aspect, in a tenth possible implementation manner of the third aspect, when communicating with the UE according to the K cell groups, the processing unit is further configured to send a cell group release message to the UE, where the cell group release message includes an identifier of a to-be-released cell group, and the to-be-released cell group is at least one cell group of the K cell groups.

With reference to any one of the third aspect or the first to the eighth possible implementation manners of the third aspect, in an eleventh possible implementation manner of the third aspect, when communicating with the UE according to the K cell groups, the processing unit is further configured to send a cell group activation message to the UE, where the cell group activation message is used to indicate a to-be-activated cell group, and the to-be-activated cell group is at least one cell group of the K cell groups.

With reference to any one of the third aspect or the first to the eighth possible implementation manners of the third aspect, in a twelfth possible implementation manner of the third aspect, when communicating with the UE according to the K cell groups, the processing unit is further configured to send a cell group activation message to the UE, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs.

With reference to any one of the third aspect or the first to the eighth possible implementation manners of the third aspect, in a thirteenth possible implementation manner of the third aspect, when communicating with the UE according to the K cell groups, the processing unit is further configured to send a cell group deactivation message to the UE, where the cell group deactivation message is used to indicate a to-be-deactivated cell group, and the to-be-deactivated cell group is at least one cell group of the K cell groups.

With reference to any one of the third aspect or the first to the eighth possible implementation manners of the third aspect, in a fourteenth possible implementation manner of the third aspect, when communicating with the UE according to the K cell groups, the processing unit is further configured to send a cell group deactivation message to the UE, where the cell group deactivation message is used to indicate a to-be-deactivated cell group and a to-be-deactivated serving cell in the to-be-activated cell group, the to-be-deactivated cell group is at least one cell group of the K cell groups, and the to-be-deactivated serving cell is at least one serving cell in the cell group to which the to-be-deactivated serving cell belongs.

With reference to the second possible implementation manner of the third aspect, in a fifteenth possible implementation manner of the third aspect, when communicating with the UE according to the K cell groups, the processing unit is further configured to receive a CQI or feedback information, sent by the UE, of at least one downlink channel using an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

With reference to the third possible implementation manner of the third aspect, in a sixteenth possible implementation manner of the third aspect, when communicating with the UE according to the K cell groups, the processing unit is further configured to communicate with the UE according to a DRX working mode using a serving cell in the licensed cell group, or communicate with the UE according to a working mode in which DRX is not configured and using a serving cell in the unlicensed cell group.

With reference to the eighth possible implementation manner of the third aspect, in a seventeenth possible implementation manner of the third aspect, when communicating with the UE according to the K cell groups, the processing unit is further configured to communicate with the UE using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

With reference to any one of the third aspect or the first to the eighth possible implementation manners of the third aspect, in an eighteenth possible implementation manner of the third aspect, when communicating with the UE according to the K cell groups, the processing unit is further configured to send downlink data to the UE using a first serving cell, where the first serving cell is any serving cell of the N serving cells, receive NACK information sent by the UE, where the NACK information indicates that the UE has not received the downlink data successfully, and send the downlink data to the UE using a second serving cell.

With reference to any one of the third aspect or the first to the eighth possible implementation manners of the third aspect, in a nineteenth possible implementation manner of the third aspect, when communicating with the UE according to the K cell groups, the processing unit is further configured to send NACK information to the UE when the base station has not successfully received uplink data sent by the UE using a first serving cell, where the NACK information is used to indicate that the base station has not successfully received the uplink data sent by the base station using the first serving cell, and the first serving cell is any serving cell of the N serving cells, and receive the uplink data sent by the UE using a second serving cell.

With reference to any one of the third aspect or the first to the eighth possible implementation manners of the third aspect, in a twentieth possible implementation manner of the third aspect, when communicating with the UE according to the K cell groups, the processing unit is further configured to send DCI to the UE using a first serving cell, where the first serving cell is any serving cell of the N serving cells, the DCI is used to instruct the UE to communicate with the base station using a second serving cell, and the first serving cell and the second serving cell belong to a same cell group, and communicate with the UE according to the DCI using the second serving cell.

With reference to any one of the third aspect or the first to the eighth possible implementation manners of the third aspect, in a twenty-first possible implementation manner of the third aspect, when communicating with the UE according to the K cell groups, the processing unit is further configured to receive communication link quality detection results, sent by the UE, of M serving cells in a first cell group, where the first cell group is any cell group of the K cell groups, and M is a positive integer less than a quantity of serving cells in the first cell group, and determine communication link quality of a remaining serving cell in the first cell group according to the communication link quality detection results of the M serving cells.

With reference to the twenty-first possible implementation manner of the third aspect, in a twenty-second possible implementation manner of the third aspect, the communication link quality detection includes one of the following or a combination thereof: whether a downlink channel is out-of-synchronization, whether an uplink channel is out-of-synchronization, an SINR of an uplink channel, or a radio link failure.

With reference to the twenty-first possible implementation manner of the third aspect or the twenty-second possible implementation manner of the third aspect, in a twenty-third possible implementation manner of the third aspect, before the processing unit receives the communication link quality detection results, sent by the UE, of the M serving cells in the first cell group, the sending unit is further configured to send communication link quality detection instruction information to the UE, where the communication link quality detection instruction information is used to instruct the UE to perform communication link quality detection on communication links of the M serving cells in the first cell group.

With reference to any one of the third aspect or the first to the eighth possible implementation manners of the third aspect, in a twenty-fourth possible implementation manner of the third aspect, when communicating with the UE according to the K cell groups, the processing unit is further configured to send information about M random access channels to the UE, where the M random access channels are respectively random access channels between the UE and M serving cells in a first cell group, the first cell group is any cell group of the K cell groups, and M is a positive integer not greater than a quantity of serving cells in the first cell group, receive a preamble sent by the UE on a first random access channel according to information about the first random access channel, where the first random access channel is any random access channel of the M random access channels, and send, using a first serving cell, a random access response corresponding to the first random access channel to the UE, where the first serving cell is any serving cell in the first cell group.

With reference to the twenty-fourth possible implementation manner of the third aspect, in a twenty-fifth possible implementation manner of the third aspect, the random access response includes uplink scheduling grant information, the uplink scheduling grant information is used to instruct the UE to send uplink information in a second serving cell, and the second serving cell and the first serving cell belong to a same cell group, and the processing unit is further configured to receive, according to the uplink scheduling grant information using the second serving cell, the uplink information sent by the UE.

With reference to any one of the third aspect or the first to the eighth possible implementation manners of the third aspect, in a twenty-sixth possible implementation manner of the third aspect, when communicating with the UE according to the K cell groups, the processing unit is further configured to receive a measurement report sent by the UE, where the measurement report is used to indicate that the UE triggers, in a first cell group, to enter a first measurement event, the first cell group is any cell group of the K cell groups, and the first measurement event is any one of measurement events.

According to a fourth aspect, an embodiment of the present disclosure provides UE, including a receiving unit configured to receive a cell grouping message sent by a base station, where the cell grouping message is used to indicate that N serving cells are grouped into K cell groups, N is an integer greater than zero, and K is an integer less than N, and a processing unit configured to communicate with the base station according to the K cell groups.

In a first possible implementation manner of the fourth aspect, the cell grouping message includes identifiers of the K cell groups, and an identifier of a serving cell included in each of the cell groups, and the cell grouping message is used to indicate that the serving cells corresponding to identifiers of the N serving cells are grouped into the cell groups corresponding to the identifiers of the K cell groups.

With reference to the fourth aspect or the first possible implementation manner of the fourth aspect, in a second possible implementation manner of the fourth aspect, when communicating with the base station according to the K cell groups, the processing unit is further configured to receive a cell group modification message sent by the base station, where the cell group modification message includes an identifier of a to-be-modified cell group and an identifier of a serving cell included in a modified cell group, and the to-be-modified cell group is at least one cell group of the K cell groups, and update the to-be-modified cell group according to the cell group modification message.

With reference to the fourth aspect or the first possible implementation manner of the fourth aspect, in a third possible implementation manner of the fourth aspect, when communicating with the base station according to the K cell groups, the processing unit is further configured to receive a cell group release message sent by the base station, where the cell group release message includes an identifier of a to-be-released cell group, and the to-be-released cell group is at least one cell group of the K cell groups, and release a serving cell in the to-be-released cell group according to the cell group release message.

With reference to the fourth aspect or the first possible implementation manner of the fourth aspect, in a fourth possible implementation manner of the fourth aspect, when communicating with the base station according to the K cell groups, the processing unit is further configured to receive a cell group activation message sent by the base station, where the cell group activation message is used to indicate a to-be-activated cell group, and the to-be-activated cell group is at least one cell group of the K cell groups, and activate a serving cell in the to-be-activated cell group according to the cell group activation message.

With reference to the fourth aspect or the first possible implementation manner of the fourth aspect, in a fifth possible implementation manner of the fourth aspect, when communicating with the base station according to the K cell groups, the processing unit is further configured to receive a cell group activation message sent by the base station, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs, and activate a to-be-activated serving cell in the to-be-activated cell group according to the cell group activation message.

With reference to the fourth aspect or the first possible implementation manner of the fourth aspect, in a sixth possible implementation manner of the fourth aspect, when communicating with the base station according to the K cell groups, the processing unit is further configured to receive a cell group deactivation message sent by the base station, where the cell group deactivation message is used to indicate a to-be-deactivated cell group, and the to-be-deactivated cell group is at least one cell group of the K cell groups, and deactivate a serving cell in the to-be-deactivated cell group according to the cell group deactivation message.

With reference to the fourth aspect or the first possible implementation manner of the fourth aspect, in a seventh possible implementation manner of the fourth aspect, when communicating with the base station according to the K cell groups, the processing unit is further configured to receive a cell group deactivation message sent by the base station, where the cell group deactivation message is used to indicate a to-be-deactivated cell group and a to-be-deactivated serving cell in the to-be-deactivated cell group, the to-be-deactivated cell group is at least one cell group of the K cell groups, and the to-be-deactivated serving cell is at least one serving cell in the cell group to which the to-be-deactivated serving cell belongs, and deactivate a to-be-deactivated serving cell in the to-be-deactivated cell group according to the cell group deactivation message.

With reference to the fourth aspect or the first possible implementation manner of the fourth aspect, in an eighth possible implementation manner of the fourth aspect, when communicating with the base station according to the K cell groups, the processing unit is further configured to send a CQI or feedback information of at least one downlink channel to the base station using an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

With reference to the fourth aspect or the first possible implementation manner of the fourth aspect, in a ninth possible implementation manner of the fourth aspect, when the N serving cells are grouped into a licensed carrier cell group and an unlicensed carrier cell group, a carrier used in a serving cell included in the licensed carrier cell is a licensed carrier, and a carrier used in a serving cell included in the unlicensed carrier cell is an unlicensed carrier, and when communicating with the base station according to the K cell groups, the processing unit is further configured to communicate with the base station according to a DRX working mode using a serving cell in the licensed carrier cell group, or communicate with the base station according to a working mode in which DRX is not configured and using a serving cell in the unlicensed carrier cell group.

With reference to the fourth aspect or the first possible implementation manner of the fourth aspect, in a tenth possible implementation manner of the fourth aspect, when communicating with the base station according to the K cell groups, the processing unit is further configured to communicate with the base station using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

With reference to the fourth aspect or the first possible implementation manner of the fourth aspect, in an eleventh possible implementation manner of the fourth aspect, when communicating with the base station according to the K cell groups, the processing unit is further configured to send NACK information to the base station when the UE has not successfully received downlink data sent by the base station using a first serving cell, where the NACK information indicates that the UE has not successfully received the downlink data, and the first serving cell is any serving cell of the N serving cells, and receive, using a second serving cell, the downlink data sent by the base station.

With reference to the fourth aspect or the first possible implementation manner of the fourth aspect, in a twelfth possible implementation manner of the fourth aspect, when communicating with the base station according to the K cell groups, the processing unit is further configured to send uplink data to the base station using a first serving cell, where the first serving cell is any serving cell of the N serving cells, receive NACK information sent by the base station, where the NACK information is used to indicate that the base station has not successfully received the uplink data, and send the uplink data to the base station using a second serving cell.

With reference to the fourth aspect or the first possible implementation manner of the fourth aspect, in a thirteenth possible implementation manner of the fourth aspect, when communicating with the base station according to the K cell groups, the processing unit is further configured to receive, using a first serving cell, DCI sent by the base station, where the first serving cell is any serving cell of the N serving cells, the DCI is used to instruct the UE to communicate with the base station using a second serving cell, and the first serving cell and the second serving cell belong to a same cell group, and communicate with the base station according to the DCI using the second serving cell.

With reference to the fourth aspect or the first possible implementation manner of the fourth aspect, in a fourteenth possible implementation manner of the fourth aspect, when communicating with the base station according to the K cell groups, the processing unit is further configured to perform communication link quality detection on communication links of M serving cells in a first cell group, to obtain communication link quality detection results of the M serving cells, where M is a positive integer less than a quantity of serving cells in the first cell group, and the first cell group is any cell group of the K cell groups, and send the communication link quality detection results of the M serving cells to the base station.

With reference to the fourth aspect or the first possible implementation manner of the fourth aspect, in a fifteenth possible implementation manner of the fourth aspect, the communication link quality detection includes at least one of the following: whether a downlink channel is out-of-synchronization, whether an uplink channel is out-of-synchronization, an SINR of an uplink channel, or a radio link failure.

With reference to the fourth aspect or the first possible implementation manner of the fourth aspect, in a sixteenth possible implementation manner of the fourth aspect, before the processing unit performs communication link quality detection on the communication links of the M serving cells in the first cell group, the receiving unit is further configured to receive communication link quality detection instruction information sent by the base station, where the communication link quality detection instruction information is used to instruct the UE to perform communication link quality detection on the communication links of the M serving cells in the first cell group, and when performing communication link quality detection on the communication links of the M serving cells in the first cell group, to obtain the communication link quality detection results of the M serving cells, the processing unit is further configured to perform communication link quality detection on the communication links of the M serving cells in the first cell group according to the communication link quality detection instruction information, to obtain the communication link quality detection results of the M serving cells.

With reference to the fourth aspect or the first possible implementation manner of the fourth aspect, in a seventeenth possible implementation manner of the fourth aspect, when communicating with the base station according to the K cell groups, the processing unit is further configured to receive information about M random access channels that is sent by the base station, where the M random access channels are respectively random access channels between the UE and M serving cells in a first cell group, the first cell group is any cell group of the K cell groups, and M is a positive integer not greater than a quantity of serving cells in the first cell group, send a preamble to the base station on a first random access channel according to information about the first random access channel, where the first random access channel is any random access channel of the M random access channels, and receive, using a first serving cell, a random access response that corresponds to the first random access channel and that is sent by the base station, where the first serving cell is any serving cell in the first cell group.

With reference to the seventeenth possible implementation manner of the fourth aspect, in an eighteenth possible implementation manner of the fourth aspect, the random access response includes uplink scheduling grant information, the uplink scheduling grant information is used to instruct the UE to send uplink information in a second serving cell, and the second serving cell and the first serving cell belong to a same cell group, and the processing unit is further configured to send the uplink information to the base station according to the uplink scheduling grant information using the second serving cell.

With reference to the fourth aspect or the first possible implementation manner of the fourth aspect, in a nineteenth possible implementation manner of the fourth aspect, when communicating with the base station according to the K cell groups, the processing unit is further configured to obtain signal quality of a primary serving cell in the K cell groups and a neighboring cell of the UE, where the primary serving cell is a serving cell that transmits control signaling and that is in a cell group to which the primary serving cell belongs, determine that the UE triggers, in a first cell group, a first measurement event to occur, according to signal quality of a primary serving cell in the first cell group, the signal quality of the neighboring cell of the UE, and a condition that is satisfied so that a measurement event occurs, where triggering the first measurement event to occur includes triggering to enter the first measurement event or triggering to leave the first measurement event, and the first measurement event is any one of measurement events, and when triggering, by the UE in the first cell group, the first measurement event to occur is triggering to enter the first measurement event, send a measurement report to the base station, where the measurement report is used to indicate that the UE triggers, in the first cell group, to enter the first measurement event.

According to the communications method and device for multi-carrier aggregation provided in the embodiments of the present disclosure, the base station groups N serving cells into K cell groups, sends a cell grouping message to the UE, where the cell grouping message is used to indicate that the N serving cells are grouped into the K cell groups, and communicates with the UE according to the K cell groups. In this way, signaling overheads can be reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
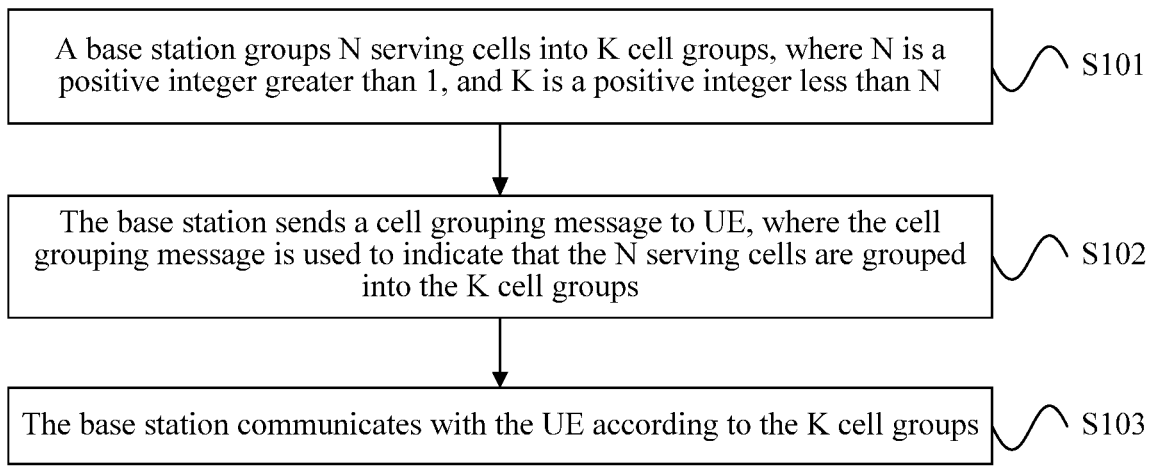
FIG. 1 is a flowchart of Embodiment 1 of a communications method for multi-carrier aggregation according to the present disclosure.

FIG. 1 is a flowchart of Embodiment 1 of a communications method for multi-carrier aggregation according to the present disclosure. As shown in FIG. 1, the method in this embodiment may include the following steps.

Step S101: A base station groups N serving cells into K cell groups, where N is a positive integer greater than 1, and K is a positive integer less than N.

In this embodiment, one serving cell corresponds to one or more carriers.

Step S102: The base station sends a cell grouping message to UE, where the cell grouping message is used to indicate that the N serving cells are grouped into the K cell groups.

In this embodiment, after grouping the N serving cells into the K cell groups, the base station sends the cell grouping message to the UE. The cell grouping message is used to indicate that the N serving cells are grouped into the K cell groups. Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups. When receiving the cell grouping message sent by the base station, the UE may determine the K cell groups into which the serving cells are grouped. The cell grouping message may be radio link control (RRC) signaling or a Media Access Control (MAC) control element (CE).

Optionally, the cell grouping message includes the identifier of the serving cell included in each cell group, and the identifiers of the K cell groups in two optional implementation manners.

In a first optional implementation manner, the cell grouping message includes the identifiers of the K cell groups, and further includes an identifier of a serving cell belonging to each cell group after an identifier of the cell group. The identifier of the cell group may be an index number (for example, 1, 2, 3, 4, or the like) of the cell group. An index number (for example, 1, 2, 3, or the like), of a serving cell belonging to each cell group, in the cell group may be further included at a next level of an identifier of each cell.

In a second optional implementation manner, the cell grouping message includes the identifiers of the N serving cells, and further includes an identifier of a cell group to which each serving cell belongs after an identifier of the serving cell. The identifier of the cell group may be an index number (for example, 1, 2, 3, 4, or the like) of the cell group. An index number (for example, 1, 2, 3, or the like) of each serving cell in a cell group to which the serving cell belongs may be further included after an identifier of the serving cell.

Step S103: The base station communicates with the UE according to the K cell groups.

In a specific implementation process, optionally, the base station and the UE may manage serving cells by cell group. That is, the base station sends one piece of management signaling to the UE to manage serving cells in a cell group. Therefore, compared with the other approaches, when the base station needs to manage all serving cells of the UE, the base station sends less management signaling to the UE. In this way, signaling overheads are reduced.

According to the communications method for multi-carrier aggregation provided in this embodiment of the present disclosure, a base station groups N serving cells into K cell groups, sends a cell grouping message to UE, where the cell grouping message is used to indicate that the N serving cells are grouped into the K cell groups, and communicates with the UE according to the K cell groups. In this way, signaling overheads can be reduced.

Optionally, the base station may group the N serving cells into the K cell groups in the following optional implementation manners.

In a first optional implementation manner, the base station groups the N serving cells into the K cell groups according to a quantity K of PUCCHs. Because the K PUCCHs are correspondingly carried in K serving cells, the K serving cells may be grouped into the K different cell groups. Therefore, the K cell groups correspond to the K PUCCHs, and each cell group includes one corresponding serving cell used to carry a carrier of a PUCCH. It should be noted that the remaining (N-K) serving cells may be grouped into K carrier groups according to a particular rule. A specific rule is not further limited in the present disclosure. Optionally, the base station may group a serving cell corresponding to a CQI transmitted on a PUCCH and a serving cell used to carry the PUCCH into a same cell group, to group the N serving cells into the K cell groups. Alternatively, the base station may group a serving cell corresponding to feedback information transmitted on a PUCCH and a serving cell used to carry the PUCCH into a same cell group, to group the N serving cells into the K cell groups. The feedback information includes ACK information or NACK information. Alternatively, the base station may group a serving cell corresponding to a scheduling request (SR) transmitted on a PUCCH and a serving cell used to carry the PUCCH into a same cell group, to group the N serving cells into the K cell groups.

In a second optional implementation manner, the base station groups the serving cells into a licensed carrier cell group or an unlicensed carrier cell group according to types of carriers used in the serving cells, where a carrier used in a serving cell included in the licensed carrier cell group is a licensed carrier, and a carrier used in a serving cell included in the unlicensed carrier cell group is an unlicensed carrier. One serving cell may correspond to one or more carriers, and carriers may be grouped into a licensed carrier and an unlicensed carrier. When a carrier corresponding to a serving cell is a licensed carrier, the serving cell may be referred to as a licensed carrier cell. When a carrier corresponding to a serving cell is an unlicensed carrier, the serving cell may be referred to as an unlicensed carrier cell. Licensed carrier cells of the N serving cells are grouped into a same cell group, and the cell group is referred to as a licensed carrier cell group. Unlicensed carrier cells of N downlink carriers are grouped into a same carrier cell group, and the cell group is referred to as an unlicensed carrier cell group.

In a third optional implementation manner, the base station groups the N serving cells into the K cell groups according to a TA, where serving cells whose TAs are the same or similar are grouped into a same cell group.

In a fourth optional implementation manner, the base station groups the N serving cells into the K cell groups according to signal quality. That is, the base station may group the serving cells into the cell groups of K signal quality levels according to signal quality of the N serving cells. Optionally, the base station may group the N serving cells into a first cell group and a second cell group according to signal quality and a preset threshold. Signal quality of a serving cell in the first cell group is greater than the preset threshold, and signal quality of a serving cell in the second cell group is not greater than the preset threshold. Further, the base station may receive a measurement report sent by the UE, where the measurement report includes signal quality of the N serving cells that may be measured by the UE. The base station determines whether signal quality of each serving cell is greater than the preset threshold. When signal quality of a serving cell is greater than the preset threshold, the base station groups the serving cell into a cell group, where the cell group is referred to as the first cell group. When signal quality of a serving cell is not greater than the preset threshold, the base station groups the serving cell into another cell group, where the other cell group is referred to as the second cell group. It should be noted that the signal quality may be indicated by a signal to noise ratio, reference signal received power (RSRP), and the like.

In a fifth optional implementation manner, the base station may group the N serving cells into the K cell groups according to that serving cells that transmit scheduling commands using a same serving cell and the serving cell that is used to transmit the scheduling commands belong to a same cell group. For example, when scheduling commands of a serving cell 2, a serving cell 3, and a serving cell 4 may be transmitted in a serving cell 1, and the scheduling commands of the serving cell 2, the serving cell 3, and the serving cell 4 may also be transmitted in a serving cell 5, the base station may group the serving cell 1, the serving cell 2, the serving cell 3, the serving cell 4, and the serving cell 5 into a same cell group.

In a sixth optional implementation manner, serving cells whose DRX configuration parameters are the same are grouped into a same cell group. The DRX configuration parameter includes, but is not limited to, one of DRX duration, a DRX inactivity timer, a DRX retransmission timer, a long DRX cycle offset, a short DRX cycle, or a DRX short cycle. For example, the base station may group serving cells whose DRX duration is the same into a same cell group using the DRX duration as a grouping criterion. Alternatively, the base station may group serving cells whose DRX duration and DRX inactivity timers are the same into a same cell group using the DRX duration and the DRX inactivity timer as a grouping criterion.

Figure 2:
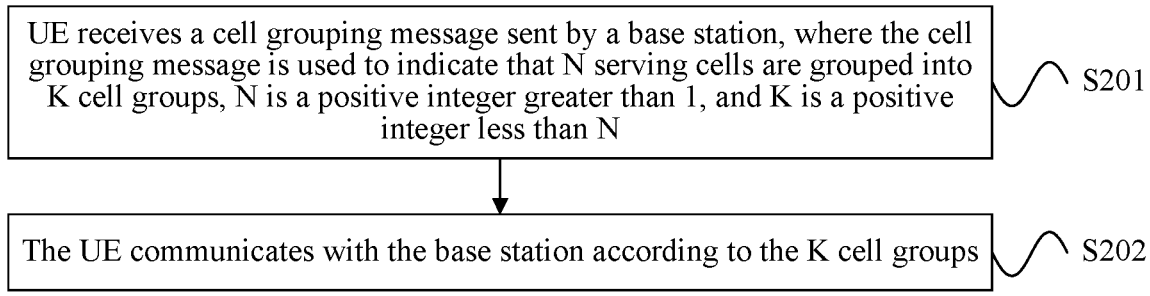
FIG. 2 is a flowchart of Embodiment 2 of a communications method for multi-carrier aggregation according to the present disclosure.

FIG. 2 is a flowchart of Embodiment 2 of a communications method for multi-carrier aggregation according to the present disclosure. As shown in FIG. 2, the method in this embodiment may include the following steps.

Step S201: UE receives a cell grouping message sent by a base station, where the cell grouping message is used to indicate that N serving cells are grouped into K cell groups, N is a positive integer greater than 1, and K is a positive integer less than N.

In this embodiment, the UE may receive the cell grouping message sent by the base station, where the cell grouping message is used to indicate that the N serving cells are grouped into the K cell groups. Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups. One serving cell corresponds to one or more carriers. The cell grouping message may be RRC signaling or a MAC CE.

Optionally, the cell grouping message includes the identifier of the serving cell included in each cell group, and the identifiers of the K cell groups in two optional implementation manners.

In a first optional implementation manner, the cell grouping message includes the identifiers of the K cell groups, and further includes an identifier of a serving cell belonging to each cell group after an identifier of the cell group. The identifier of the cell group may be an index number (for example, 1, 2, 3, 4, or the like) of the cell group. An index number (for example, 1, 2, 3, or the like), of a serving cell belonging to each cell group, in the cell group may be further included at a next level of an identifier of each cell.

In a second optional implementation manner, the cell grouping message includes the identifiers of the N serving cells, and further includes an identifier of a cell group to which each serving cell belongs after an identifier of the serving cell. The identifier of the cell group may be an index number (for example, 1, 2, 3, 4, or the like) of the cell group. An index number (for example, 1, 2, 3, or the like) of each serving cell in a cell group to which the serving cell belongs may be further included after an identifier of the serving cell.

Step S202: The UE communicates with the base station according to the K cell groups.

In this embodiment, after receiving the cell grouping message sent by the base station, the UE may obtain, from the cell grouping message, the K cell groups into which the serving cells are grouped. In a specific implementation process, optionally, the UE and the base station may manage serving cells by cell group. That is, the base station sends one piece of management signaling to the UE to manage serving cells in a cell group. Therefore, compared with the other approaches, when the base station needs to manage all serving cells of the UE, the base station sends less management signaling to the UE. In this way, signaling overheads are reduced.

According to the communications method for multi-carrier aggregation provided in this embodiment of the present disclosure, UE receives a cell grouping message sent by a base station, where the cell grouping message is used to indicate that N serving cells are grouped into K cell groups, and communicates with the base station according to the K cell groups. Therefore, signaling overheads can be reduced.

Optionally, if the base station groups the N serving cells into a licensed carrier cell group and an unlicensed carrier cell group, the base station may not send the cell grouping message to the UE. In this case, the UE can also obtain a grouping manner of the N serving cells. That is, the UE may group the serving cells into the licensed carrier cell group and the unlicensed carrier cell group according to types of carriers used in the serving cells. The base station and UE may communicate with each other according to the licensed cell group and the unlicensed cell group.

Figure 3:
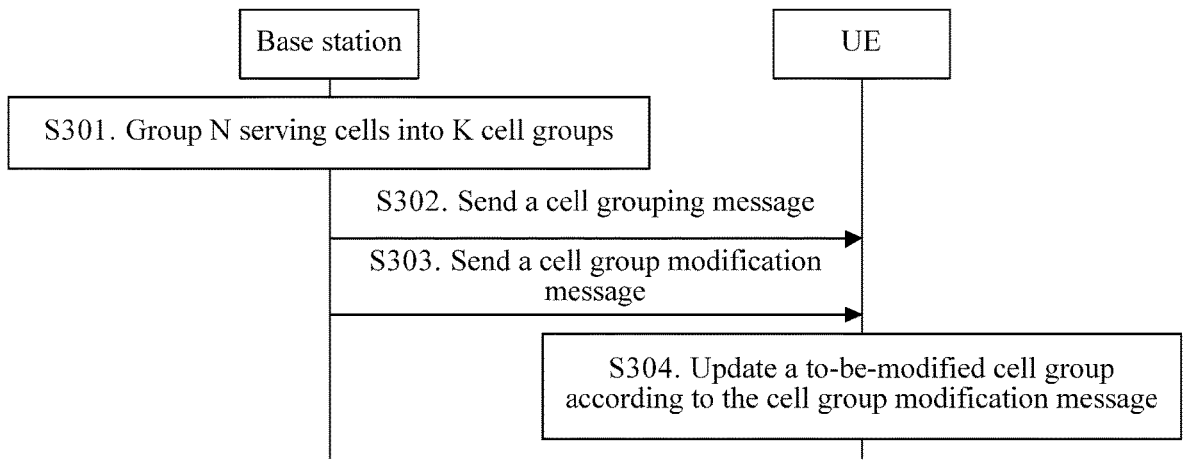
FIG. 3 is a flowchart of Embodiment 3 of a communications method for multi-carrier aggregation according to the present disclosure.

FIG. 3 is a flowchart of Embodiment 3 of a communications method for multi-carrier aggregation according to the present disclosure. As shown in FIG. 3, the method in this embodiment may include the following steps.

Step S301: A base station groups N serving cells into K cell groups.

Step S302: The base station sends a cell grouping message to UE.

In this embodiment, for specific implementation processes of steps S301 and S302 in this embodiment, refer to the related record in Embodiment 1 or Embodiment 2 of the method of the present disclosure. Details are not described again herein.

Step S303: The base station sends a cell group modification message to the UE.

In this embodiment, in an optional implementation manner, when the base station communicates with the UE according to the K cell groups, the base station may modify a serving cell in a cell group.

When serving cells included in a cell group are modified, the base station may determine serving cells included in the cell group after modification, and send the cell group modification message to the UE. The cell group modification message includes an identifier of the to-be-modified cell group, and an identifier of a cell included in the cell group after modification, and the to-be-modified cell group is at least one cell group of the K cell groups.

Step S304: The UE updates a to-be-modified cell group according to the cell group modification message.

In this embodiment, after receiving the cell group modification message sent by the base station, the UE updates the to-be-modified cell group according to the cell group modification message. For example, before step S303 is performed, a cell group 1 includes a serving cell A, a serving cell B, and a serving cell C, and a cell group 2 includes a serving cell D, a serving cell E, and a serving cell F. When performing step S304, the UE may update the cell group 1 so that the cell group 1 includes the serving cell A, the serving cell B, and the serving cell D, and updates the cell group 2 so that the cell group 2 includes the serving cell C, the serving cell E, and the serving cell F.

According to the communications method for multi-carrier aggregation provided in this embodiment of the present disclosure, a base station groups N serving cells into K cell groups, sends a cell grouping message to UE, and sends a cell group modification message to the UE, and the UE updates a to-be-modified cell group according to the cell group modification message. In this way, a serving cell with relatively poor signal quality or relatively heavy load in the cell group may be replaced with another better serving cell.

Figure 4:
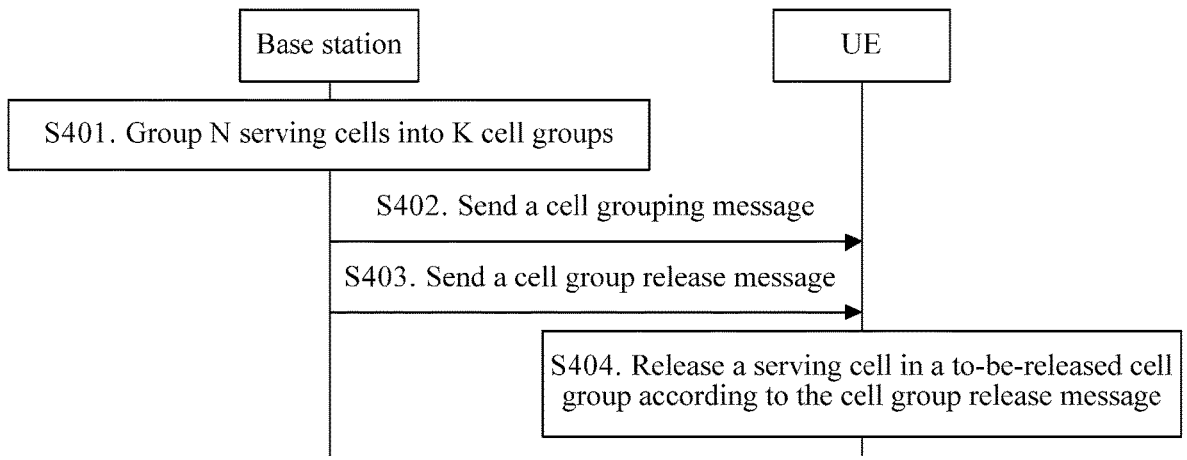
FIG. 4 is a flowchart of Embodiment 4 of a communications method for multi-carrier aggregation according to the present disclosure.

FIG. 4 is a flowchart of Embodiment 4 of a communications method for multi-carrier aggregation according to the present disclosure. As shown in FIG. 4, the method in this embodiment may include the following steps.

Step S401: A base station groups N serving cells into K cell groups.

Step S402: The base station sends a cell grouping message to UE.

In this embodiment, for specific implementation processes of steps S401 and S402 in this embodiment, refer to the related records in Embodiment 1 or Embodiment 2 of the method of the present disclosure. Details are not described again herein.

Step S403: The base station sends a cell group release message to the UE.

In this embodiment, in an optional implementation manner, when the base station communicates with the UE according to the K cell groups, the base station may release a serving cell in a cell group.

The base station may send the cell group release message to the UE, where the cell group release message includes an identifier of a to-be-released cell group, and the to-be-released cell group is at least one cell group of the K cell groups.

Step S404: The UE releases a serving cell in the to-be-released cell group according to the cell group release message.

In this embodiment, after receiving the cell group release message sent by the base station, the UE releases a serving cell in the cell group according to the cell group release message. For example, a cell group 1 is released, and the cell group 1 includes a serving cell A, a serving cell B, and a serving cell C. In this embodiment, when the base station sends the cell group release message including an identifier of the cell group 1 to the UE, the serving cell A, the serving cell B, and the serving cell C can be released. However, in the other approaches, the base station needs to send a cell release message including identifiers of the serving cell A, the serving cell B, and the serving cell C to the UE, to release the serving cell A, the serving cell B, and the serving cell C. Therefore, in this embodiment, the message sent to the UE includes less information while the same function is implemented, and signaling overheads can be reduced.

According to the communications method for multi-carrier aggregation provided in this embodiment of the present disclosure, a base station groups N serving cells into K cell groups, sends a cell grouping message to UE, and sends a cell group release message including an identifier of a to-be-released cell group to the UE, and the UE releases a serving cell in the to-be-released cell group according to the cell group release message. In this way, signaling overheads are reduced.

Figure 5:
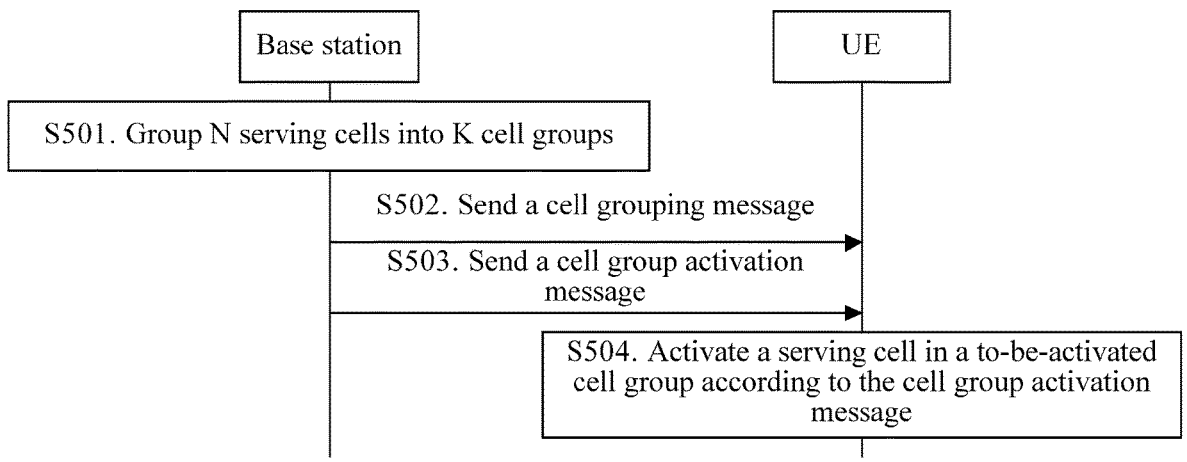
FIG. 5 is a flowchart of Embodiment 5 of a communications method for multi-carrier aggregation according to the present disclosure.

FIG. 5 is a flowchart of Embodiment 5 of a communications method for multi-carrier aggregation according to the present disclosure. As shown in FIG. 5, the method in this embodiment may include the following steps.

Step S501: A base station groups N serving cells into K cell groups.

Step S502: The base station sends a cell grouping message to UE.

In this embodiment, for specific implementation processes of steps S501 and S502 in this embodiment, refer to the related records in Embodiment 1 or Embodiment 2 of the method of the present disclosure. Details are not described again herein.

Step S503: The base station sends a cell group activation message to the UE.

In this embodiment, in an optional implementation manner, when the base station communicates with the UE according to the K cell groups, the base station may activate a serving cell in a cell group.

The base station may send the cell group activation message to the UE, where the cell group release message is used to indicate a to-be-activated cell group, and the to-be-activated cell group is at least one cell group of the K cell groups.

Step S504: The UE activates a serving cell in a to-be-activated cell group according to the cell group activation message.

In this embodiment, after receiving the cell group activation message sent by the base station, the UE activates a serving cell in the cell group according to the cell group activation message. For example, a cell group 1 is activated, and the cell group 1 includes a serving cell A, a serving cell B, and a serving cell C. In this embodiment, when the base station sends the cell group activation message used to indicate the cell group 1 to the UE, the serving cell A, the serving cell B, and the serving cell C can be activated. However, in the other approaches, the base station needs to send a cell activation message used to indicate the serving cell A, the serving cell B, and the serving cell C to the UE, to activate the serving cell A, the serving cell B, and the serving cell C. Therefore, in this embodiment, the message sent to the UE includes less information while the same function is implemented, and signaling overheads can be reduced.

Figure 22:
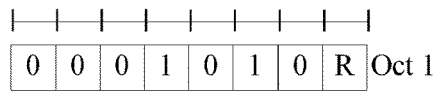
FIGS. 22-29 are mapping tables according to embodiments of the present disclosure.

Optionally, the cell group activation message may be used to indicate the to-be-activated cell group in a mapping manner. For example, the base station groups serving cells into seven cell groups, and index numbers of the seven cell groups are respectively 1, 2, 3, 4, 5, 6, and 7. When the base station needs to activate cell groups whose index numbers are 2 and 4, the cell group activation message sent by the base station to the UE may include the mapping table shown in FIG. 22.

The first bit on the left of the mapping table indicates whether to activate a cell group whose index number is 7, the second bit on the left of the mapping table indicates whether to activate a cell group whose index number is 6, the third bit on the left of the mapping table indicates whether to activate a cell group whose index number is 5, the fourth bit on the left of the mapping table indicates whether to activate a cell group whose index number is 4, the fifth bit on the left of the mapping table indicates whether to activate a cell group whose index number is 3, the sixth bit on the left of the mapping table indicates whether to activate a cell group whose index number is 2, and the seventh bit on the left of the mapping table indicates whether to activate a cell group whose index number is 1. 0 indicates inactivation, and 1 indicates activation. The mapping table referenced above indicates that to-be-activated cell groups are the cell group whose index number is 2 and the cell group whose index number is 4.

According to the communications method for multi-carrier aggregation provided in this embodiment of the present disclosure, a base station groups N serving cells into K cell groups, sends a cell grouping message to UE, and sends a cell group activation message used to indicate a to-be-activated cell group to the UE, and the UE activates a serving cell in the to-be-activated cell group according to the cell group activation message. In this way, signaling overheads are reduced.

Figure 6:
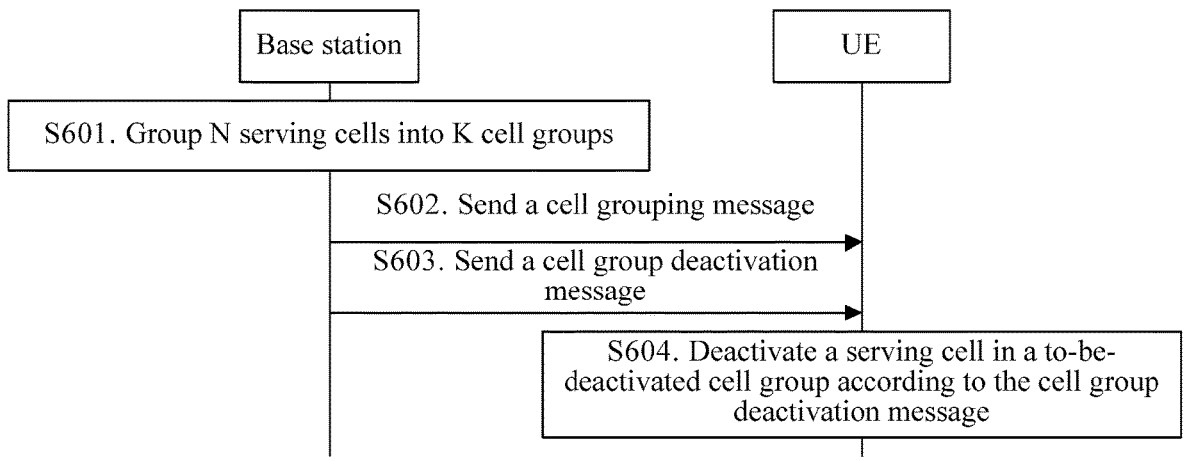
FIG. 6 is a flowchart of Embodiment 6 of a communications method for multi-carrier aggregation according to the present disclosure.

FIG. 6 is a flowchart of Embodiment 6 of a communications method for multi-carrier aggregation according to the present disclosure. As shown in FIG. 6, the method in this embodiment may include the following steps.

Step S601: A base station groups N serving cells into K cell groups.

Step S602: The base station sends a cell grouping message to UE.

In this embodiment, for specific implementation processes of steps S601 and S602 in this embodiment, refer to the related records in Embodiment 1 or Embodiment 2 of the method of the present disclosure. Details are not described again herein.

Step S603: The base station sends a cell group deactivation message to the UE.

In this embodiment, in an optional implementation manner, when the base station communicates with the UE according to the K cell groups, the base station may activate a serving cell in a cell group.

The base station may send the cell group deactivation message to the UE, where the cell group deactivation message is used to indicate a to-be-deactivated cell group, and the to-be-deactivated cell group is at least one cell group of the K cell groups.

Step S604: The UE deactivates a serving cell in a to-be-deactivated cell group according to the cell group deactivation message.

In this embodiment, after receiving the cell group deactivation message sent by the base station, the UE deactivates a serving cell in the cell group according to the cell group deactivation message. For example, a cell group 1 is deactivated, and the cell group 1 includes a serving cell A, a serving cell B, and a serving cell C. In this embodiment, when the base station sends the cell group deactivation message used to indicate the cell group 1 to the UE, the serving cell A, the serving cell B, and the serving cell C can be deactivated. However, in the other approaches, the base station needs to send a cell deactivation message used to indicate the serving cell A, the serving cell B, and the serving cell C to the UE, to deactivate the serving cell A, the serving cell B, and the serving cell C. Therefore, in this embodiment, the message sent to the UE includes less information while the same function is implemented, and signaling overheads can be reduced.

Figure 23:
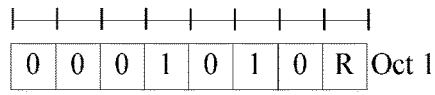

Optionally, the cell group deactivation message may be used to indicate the to-be-deactivated cell group in a mapping manner. For example, the base station groups serving cells into seven cell groups, and index numbers of the seven cell groups are respectively 1, 2, 3, 4, 5, 6, and 7. When the base station needs to deactivate cell groups whose index numbers are 2 and 4, the cell group deactivation message sent by the base station to the UE may include the mapping table shown in FIG. 23.

The first bit on the left of the mapping table indicates whether to deactivate a cell group whose index number is 7, the second bit on the left of the mapping table indicates whether to deactivate a cell group whose index number is 6, the third bit on the left of the mapping table indicates whether to deactivate a cell group whose index number is 5, the fourth bit on the left of the mapping table indicates whether to deactivate a cell group whose index number is 4, the fifth bit on the left of the mapping table indicates whether to deactivate a cell group whose index number is 3, the sixth bit on the left of the mapping table indicates whether to deactivate a cell group whose index number is 2, and the seventh bit on the left of the mapping table indicates whether to deactivate a cell group whose index number is 1. 0 indicates non-deactivation, and 1 indicates deactivation. The mapping table shown in FIG. 23 indicates that to-be-deactivated cell groups are the cell group whose index number is 2 and the cell group whose index number is 4.

According to the communications method for multi-carrier aggregation provided in this embodiment of the present disclosure, a base station groups N serving cells into K cell groups, sends a cell grouping message to UE, and sends a cell group deactivation message used to indicate a to-be-deactivated cell group to the UE, and the UE deactivates a serving cell in the to-be-deactivated cell group according to the cell group deactivation message. In this way, signaling overheads are reduced.

Figure 7:
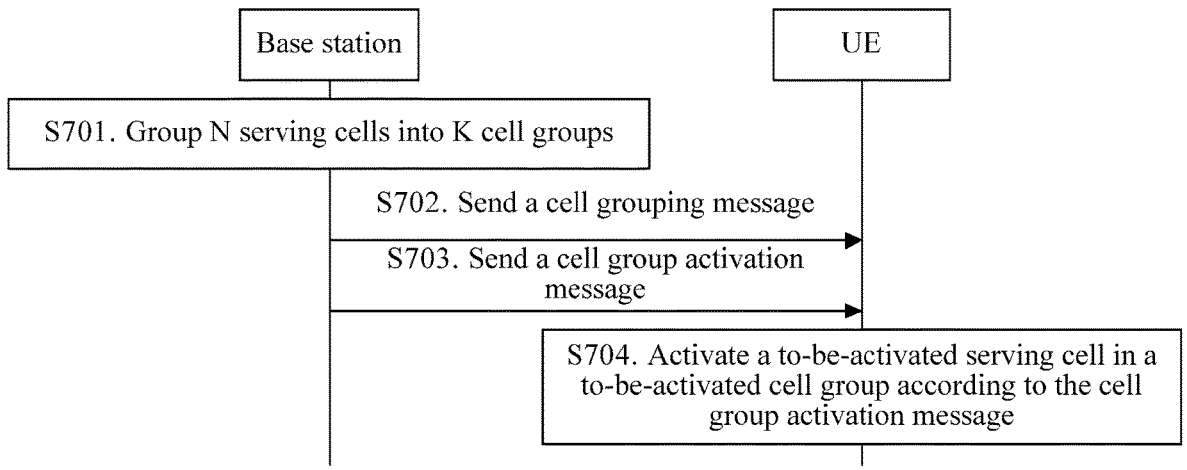
FIG. 7 is a flowchart of Embodiment 7 of a communications method for multi-carrier aggregation according to the present disclosure.

FIG. 7 is a flowchart of Embodiment 7 of a communications method for multi-carrier aggregation according to the present disclosure. As shown in FIG. 7, the method in this embodiment may include the following steps.

Step S701: A base station groups N serving cells into K cell groups.

Step S702: The base station sends a cell grouping message to UE.

In this embodiment, for specific implementation processes of steps S701 and S702 in this embodiment, refer to the related records in Embodiment 1 or Embodiment 2 of the method of the present disclosure. Details are not described again herein.

Step S703: The base station sends a cell group activation message to the UE.

In this embodiment, in an optional implementation manner, when the base station communicates with the UE according to the K cell groups, the base station may activate a serving cell in a cell group.

The base station may send the cell group activation message to the UE, where the cell group activation message is used to indicate a to-be-activated cell group. Because not all serving cells in the to-be-activated cell group need to be activated, the cell group activation message is further used to indicate a to-be-activated serving cell in the to-be-activated cell group. The to-be-activated cell group is at least one cell group of the K cell groups, and the to-be-activated serving cell is at least one serving cell in the to-be-activated cell group.

Step S704: The UE activates a to-be-activated serving cell in a to-be-activated cell group according to the cell group activation message.

In this embodiment, after receiving the cell group activation message sent by the base station, the UE may determine the to-be-activated serving cell in the to-be-activated cell group according to the cell group activation message, and activate the to-be-activated serving cell in the to-be-activated cell group. For example, a cell group 1 is activated, and the cell group 1 includes a serving cell A, a serving cell B, and a serving cell C. In this embodiment, the base station sends the cell group activation message used to indicate the cell group 1 and the serving cell A in the cell group 1 to the UE, to activate the serving cell A. In this way, on the basis of cell-group-based activation, a single serving cell in the cell group can be activated.

Optionally, the cell group activation message may be used to indicate the to-be-activated cell group in a mapping manner. For example, the base station groups serving cells into seven cell groups, and each cell group includes seven serving cells. Index numbers of the seven cell groups are respectively 1, 2, 3, 4, 5, 6, and 7, and index numbers, of serving cells included in each cell group, in the cell group are respectively 1, 2, 3, 4, 5, 6, and 7. When the base station needs to activate the serving cells whose index numbers are 2 and 4 in the cell group whose index number is 2, and activate the serving cells whose index number is 2 and 4 in the cell group whose index number is 4, the cell group activation message sent by the base station to the UE may include three mapping tables.

Figure 24:
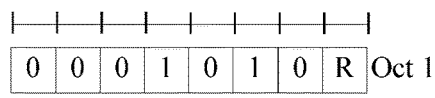

A first mapping table is shown in FIG. 24.

The first bit on the left of the mapping table indicates whether to activate a cell group whose index number is 7, the second bit on the left of the mapping table indicates whether to activate a cell group whose index number is 6, the third bit on the left of the mapping table indicates whether to activate a cell group whose index number is 5, the fourth bit on the left of the mapping table indicates whether to activate a cell group whose index number is 4, the fifth bit on the left of the mapping table indicates whether to activate a cell group whose index number is 3, the sixth bit on the left of the mapping table indicates whether to activate a cell group whose index number is 2, and the seventh bit on the left of the mapping table indicates whether to activate a cell group whose index number is 1. 0 indicates inactivation, and 1 indicates activation.

Figure 25:
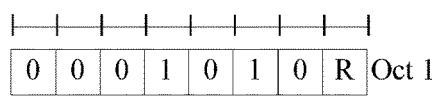

A second mapping table is shown in FIG. 25.

The second mapping table shows an activation status of a serving cell in a to-be-activated cell group whose index number ranks first. The first bit on the left of the mapping table indicates whether to activate the serving cell whose index number is 7 in the cell group whose index number is 2, the second bit on the left of the mapping table indicates whether to activate the serving cell whose index number is 6 in the cell group whose index number is 2, the third bit on the left of the mapping table indicates whether to activate the serving cell whose index number is 5 in the cell group whose index number is 2, the fourth bit on the left of the mapping table indicates whether to activate the serving cell whose index number is 4 in the cell group whose index number is 2, the fifth bit on the left of the mapping table indicates whether to activate the serving cell whose index number is 3 in the cell group whose index number is 2, the sixth bit on the left of the mapping table indicates whether to activate the serving cell whose index number is 2 in the cell group whose index number is 2, and the seventh bit on the left of the mapping table indicates whether to activate the serving cell whose index number is 1 in the cell group whose index number is 2. 0 indicates inactivation, and 1 indicates activation.

Figure 26:
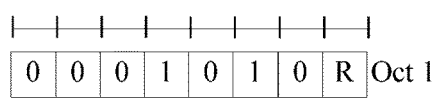

A third mapping table is shown in FIG. 26.

The third mapping table shows an activation status of a serving cell in a to-be-activated cell group whose index number ranks second. The first bit on the left of the mapping table indicates whether to activate the serving cell whose index number is 7 in the cell group whose index number is 4, the second bit on the left of the mapping table indicates whether to activate the serving cell whose index number is 6 in the cell group whose index number is 4, the third bit on the left of the mapping table indicates whether to activate the serving cell whose index number is 5 in the cell group whose index number is 4, the fourth bit on the left of the mapping table indicates whether to activate the serving cell whose index number is 4 in the cell group whose index number is 4, the fifth bit on the left of the mapping table indicates whether to activate the serving cell whose index number is 3 in the cell group whose index number is 4, the sixth bit on the left of the mapping table indicates whether to activate the serving cell whose index number is 2 in the cell group whose index number is 4, and the seventh bit on the left of the mapping table indicates whether to activate the serving cell whose index number is 1 in the cell group whose index number is 4. 0 indicates inactivation, and 1 indicates activation.

According to the communications method for multi-carrier aggregation provided in this embodiment of the present disclosure, a base station groups N serving cells into K cell groups, sends a cell grouping message to UE, and sends a cell group activation message used to indicate a to-be-activated cell group and a to-be-activated serving cell in the to-be-activated cell to the UE, and the UE activates the to-be-activated serving cell in the to-be-activated cell group according to the cell group activation message. In this way, signaling overheads are reduced.

Figure 8:
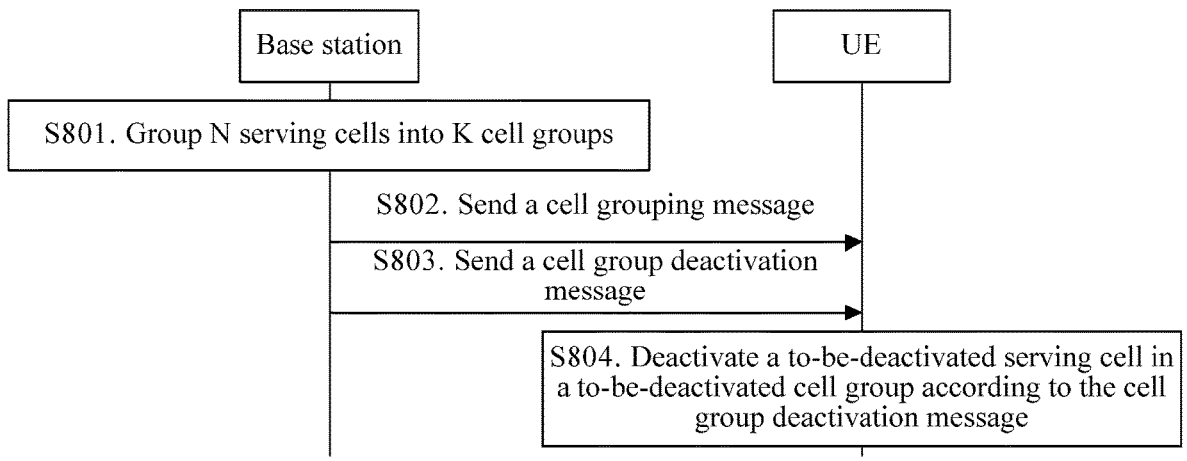
FIG. 8 is a flowchart of Embodiment 8 of a communications method for multi-carrier aggregation according to the present disclosure.

FIG. 8 is a flowchart of Embodiment 8 of a communications method for multi-carrier aggregation according to the present disclosure. As shown in FIG. 8, the method in this embodiment may include the following steps.

Step S801: A base station groups N serving cells into K cell groups.

Step S802: The base station sends a cell grouping message to UE.

In this embodiment, for specific implementation processes of steps S801 and S802 in this embodiment, refer to the related records in Embodiment 1 or Embodiment 2 of the method of the present disclosure. Details are not described again herein.

Step S803: The base station sends a cell group deactivation message to the UE.

In this embodiment, in an optional implementation manner, when the base station communicates with the UE according to the K cell groups, the base station may deactivate a serving cell in a cell group.

The base station may send the cell group deactivation message to the UE, where the cell group deactivation message is used to indicate a to-be-activated cell group. Because not all serving cells in the to-be-activated cell group need to be deactivated, the cell group deactivation message is further used to indicate a to-be-deactivated serving cell in the to-be-deactivated cell group. The to-be-deactivated cell group is at least one cell group of the K cell groups, and the to-be-deactivated serving cell is at least one serving cell in the to-be-deactivated cell group.

Step S804: The UE deactivates a to-be-deactivated serving cell in a to-be-deactivated cell group according to the cell group deactivation message.

In this embodiment, after receiving the cell group deactivation message sent by the base station, the UE may determine the to-be-deactivated serving cell in the to-be-deactivated cell group according to the cell group deactivation message, and activate the to-be-deactivated serving cell in the to-be-deactivated cell group. For example, a cell group 1 is deactivated, and the cell group 1 includes a serving cell A, a serving cell B, and a serving cell C. In this embodiment, the base station sends the cell group deactivation message used to indicate the cell group 1 and the serving cell A in the cell group 1 to the UE, to deactivate the serving cell A.

Optionally, the cell group activation message may be used to indicate the to-be-deactivated cell group in a mapping manner. For example, the base station groups serving cells into seven cell groups, and each cell group includes seven serving cells. Index numbers of the seven cell groups are respectively 1, 2, 3, 4, 5, 6, and 7, and index numbers of serving cells included in each cell group, in the cell group are respectively 1, 2, 3, 4, 5, 6, and 7. When the base station needs to deactivate the serving cells whose index numbers are 2 and 4 in the cell group whose index number is 2, and deactivate the serving cells whose index number is 2 and 4 in the cell group whose index number is 4, the cell group deactivation message sent by the base station to the UE may include three mapping tables.

Figure 27:
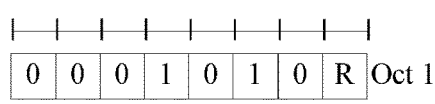

A first mapping table is shown in FIG. 27.

The first bit on the left of the mapping table indicates whether to deactivate a cell group whose index number is 7, the second bit on the left of the mapping table indicates whether to deactivate a cell group whose index number is 6, the third bit on the left of the mapping table indicates whether to deactivate a cell group whose index number is 5, the fourth bit on the left of the mapping table indicates whether to deactivate a cell group whose index number is 4, the fifth bit on the left of the mapping table indicates whether to deactivate a cell group whose index number is 3, the sixth bit on the left of the mapping table indicates whether to deactivate a cell group whose index number is 2, and the seventh bit on the left of the mapping table indicates whether to deactivate a cell group whose index number is 1. 0 indicates non-deactivation, and 1 indicates deactivation.

Figure 28:
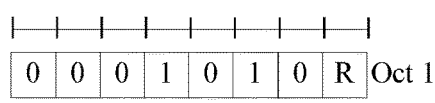

A second mapping table is shown in FIG. 28.

The second mapping table shows a deactivation status of a serving cell in a to-be-activated cell group whose index number ranks first. The first bit on the left of the mapping table indicates whether to deactivate the serving cell whose index number is 7 in the cell group whose index number is 2, the second bit on the left of the mapping table indicates whether to deactivate the cell group whose index number is 6 in the serving cell whose index number is 2, the third bit on the left of the mapping table indicates whether to deactivate the serving cell whose index number is 5 in the cell group whose index number is 2, the fourth bit on the left of the mapping table indicates whether to deactivate the serving cell whose index number is 4 in the cell group whose index number is 2, the fifth bit on the left of the mapping table indicates whether to deactivate the serving cell whose index number is 3 in the cell group whose index number is 2, the sixth bit on the left of the mapping table indicates whether to deactivate the serving cell whose index number is 2 in the cell group whose index number is 2, and the seventh bit on the left of the mapping table indicates whether to deactivate the serving cell whose index number is 1 in the cell group whose index number is 2. 0 indicates non-deactivation, and 1 indicates deactivation.

Figure 29:
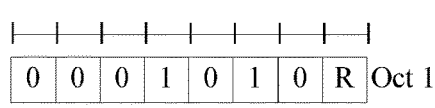

A third mapping table is shown in FIG. 29.

The third mapping table shows a deactivation status of a serving cell in a to-be-deactivated cell group whose index number ranks second. The first bit on the left of the mapping table indicates whether to deactivate the serving cell whose index number is 7 in the cell group whose index number is 4, the second bit on the left of the mapping table indicates whether to deactivate the serving cell whose index number is 6 in the cell group whose index number is 4, the third bit on the left of the mapping table indicates whether to deactivate the serving cell whose index number is 5 in the cell group whose index number is 4, the fourth bit on the left of the mapping table indicates whether to deactivate the serving cell whose index number is 4 in the cell group whose index number is 4, the fifth bit on the left of the mapping table indicates whether to deactivate the serving cell whose index number is 3 in the cell group whose index number is 4, the sixth bit on the left of the mapping table indicates whether to deactivate the serving cell whose index number is 2 in the cell group whose index number is 4, and the seventh bit on the left of the mapping table indicates whether to deactivate the serving cell whose index number is 1 in the cell group whose index number is 4. 0 indicates non-deactivation, and 1 indicates deactivation.

According to the communications method for multi-carrier aggregation provided in this embodiment of the present disclosure, a base station groups N serving cells into K cell groups, sends a cell grouping message to UE, and sends a cell group deactivation message used to indicate a to-be-deactivated cell group and a to-be-deactivated serving cell in the to-be-deactivated cell to the UE, and the UE deactivates the serving cell in the to-be-deactivated cell group according to the cell group deactivation message. In this way, signaling overheads are reduced.

Figure 9:
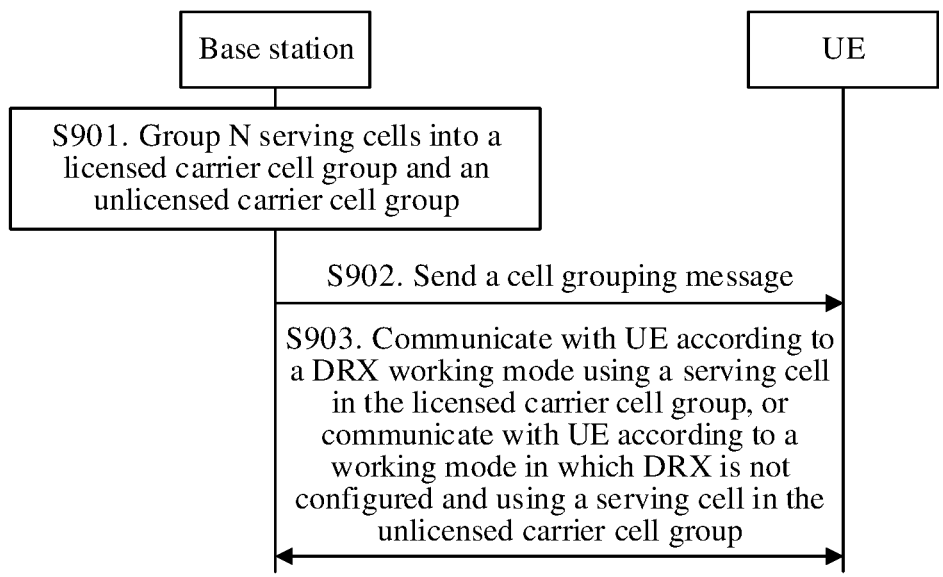
FIG. 9 is a flowchart of Embodiment 9 of a communications method for multi-carrier aggregation according to the present disclosure.

FIG. 9 is a flowchart of Embodiment 9 of a communications method for multi-carrier aggregation according to the present disclosure. As shown in FIG. 9, the method in this embodiment may include the following steps.

Step S901: A base station groups N serving cells into a licensed carrier cell group and an unlicensed carrier cell group.

In this embodiment, a carrier used in a serving cell included in the licensed carrier cell group is a licensed carrier, and a carrier used in a serving cell included in the unlicensed cell group is an unlicensed carrier. For a specific implementation process of step S901, refer to the record in the second optional implementation manner in which the base station groups the N serving cells into the K cell groups in Embodiment 1 of the foregoing method according to the present disclosure. Details are not described herein again.

Step S902: The base station sends a cell grouping message to UE.

In this embodiment, after grouping the N serving cells into the licensed carrier cell group and the unlicensed carrier cell group, the base station sends the cell grouping message to the UE. Optionally, the cell grouping message may include an identifier of the licensed carrier cell group, an identifier of the unlicensed carrier cell group, an identifier of a serving cell included in the licensed carrier cell group, and an identifier of a serving cell included in the unlicensed carrier cell group. After receiving the cell grouping message sent by the base station, the UE may learn that the N serving cells are respectively grouped into the licensed carrier cell group and the unlicensed carrier cell group.

Step S903: The base station communicates with the UE according to a DRX working mode using a serving cell in the licensed carrier cell group, or communicates with the UE according to a working mode in which DRX is not configured and using a serving cell in the unlicensed carrier cell group.

In this embodiment, when DRX needs to be configured, the base station may communicate with the UE according to the DRX working mode in each serving cell in the licensed carrier cell group. In each serving cell in the unlicensed carrier cell, the base station may communicate with the UE according to the working mode in which DRX is not configured.

According to the communications method for multi-carrier aggregation provided in this embodiment of the present disclosure, a base station groups N serving cells into a licensed carrier cell group and an unlicensed carrier cell group, and sends a cell grouping message to UE. The base station communicates with the UE according to a DRX working mode using a serving cell in the licensed carrier cell group, or communicates with the UE according to a working mode in which DRX is not configured and using a serving cell in the unlicensed carrier cell group. In this way, when the UE communicates with the base station in a licensed carrier cell using a licensed carrier, the UE uses a DRX configuration, to reduce electricity consumed by the UE. When the UE uses an unlicensed carrier in an unlicensed carrier cell, the UE does not use the DRX configuration to improve resource usage of the unlicensed carrier.

Figure 10:
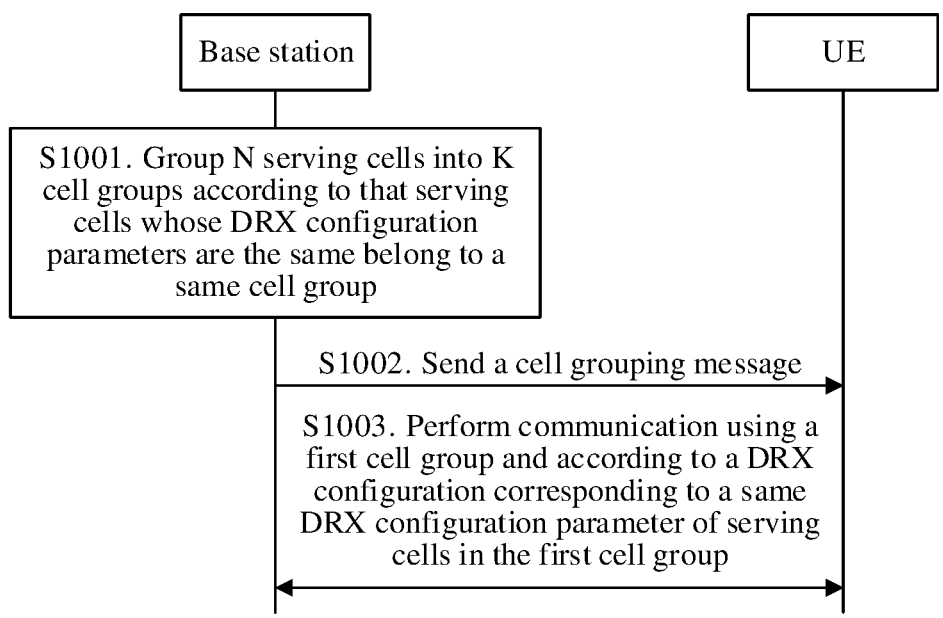
FIG. 10 is a flowchart of Embodiment 10 of a communications method for multi-carrier aggregation according to the present disclosure.

FIG. 10 is a flowchart of Embodiment 10 of a communications method for multi-carrier aggregation according to the present disclosure. As shown in FIG. 10, the method in this embodiment may include the following steps.

Step S1001: A base station groups N serving cells into K cell groups according to that serving cells whose DRX configuration parameters are the same belong to a same cell group.

Step S1002: The base station sends a cell grouping message to UE.

In this embodiment, for specific implementation processes of steps S1001 and S1002, refer to the record in the sixth optional implementation manner in which the base station groups the N serving cells into the K cell groups in Embodiment 1 of the foregoing method according to the present disclosure. Details are not described herein again.

Step S1003: The base station communicates with the UE using a first cell group and according to a DRX configuration corresponding to a same DRX configuration parameter of serving cells in the first cell group.

In this embodiment, the first cell group is any cell group of the K cell groups, and the base station communicates with the UE in any cell in the first cell group according to the DRX configuration corresponding to the same DRX configuration parameter of the serving cells in the first cell group. For example, if the DRX configuration parameter includes DRX duration, the base station sends a physical downlink control channel (PDCCH) command to the UE in a first cell in the first cell group, where the first cell is any serving cell in the first cell group, and DRX duration of serving cells in the first cell group is the same. Correspondingly, after receiving the PDCCH command in the first cell, the UE starts a timer in each serving cell in the first cell group according to the first cell group to which the first cell belongs, and performs an operation corresponding to the DRX duration.

According to the communications method for multi-carrier aggregation provided in this embodiment, a base station groups N serving cells into K cell groups according to that serving cells whose DRX configuration parameters are the same belong to a same cell group, sends a cell grouping message to UE, and communicates with the UE using a first cell group and according to a DRX configuration corresponding to a same DRX configuration parameter of serving cells in the first cell group. In this way, the UE flexibly communicates with the base station using a DRX configuration, to reduce electricity consumed by the UE.

Figure 11:
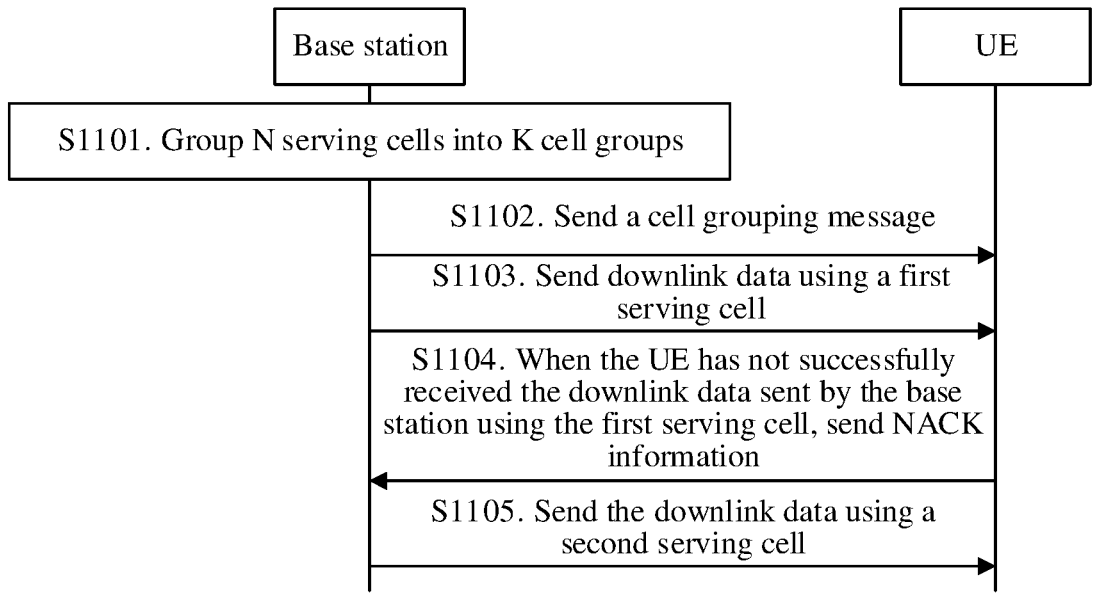
FIG. 11 is a flowchart of Embodiment 11 of a communications method for multi-carrier aggregation according to the present disclosure.

FIG. 11 is a flowchart of Embodiment 11 of a communications method for multi-carrier aggregation according to the present disclosure. As shown in FIG. 11, the method in this embodiment may include the following steps.

Step S1101: A base station groups N serving cells into K cell groups.

Step S1102: The base station sends a cell grouping message to UE.

In this embodiment, for specific implementation processes of steps S1101 and S1102 in this embodiment, refer to the related records in Embodiment 1 or Embodiment 2 of the method of the present disclosure. Details are not described again herein.

Step S1103: The base station sends downlink data to the UE using a first serving cell.

The first serving cell is any serving cell of the N serving cells.

Step S1104: When the UE has not successfully received the downlink data sent by the base station using the first serving cell, the UE sends NACK information to the base station.

In this embodiment, when the UE has not successfully received the downlink data (for example, the UE has not received the downlink data sent by the base station using the first serving cell, or the UE has received the downlink data sent by the base station using the first serving cell, but cannot parse out data) sent by the base station using the first serving cell, the UE sends NACK information to the base station. The NACK information is used to indicate that the UE has not successfully received the downlink data.

Step S1105: The base station sends the downlink data to the UE using a second serving cell.

In this embodiment, optionally, the second serving cell and the first serving cell belong to a same cell group. After receiving the NACK information sent by the UE, the base station may retransmit the downlink data. In a specific implementation process, when the base station needs to retransmit the downlink data, because the first serving cell may have no resource for retransmission, or channel quality of the first serving cell may be relatively poor, the first serving cell is no longer selected for retransmission. The base station retransmits the downlink data using the following two optional methods.

The base station determines the cell group to which the first serving cell belongs, and selects the second serving cell from the cell group to retransmit the downlink data. In this way, cross-serving-cell retransmission, that is, cross-carrier retransmission can be implemented. One serving cell corresponds to one or more carriers. Optionally, the second serving cell and the first serving cell may belong to different cell groups. The base station may select a serving cell (that is, the second serving cell) according to signal quality and load of each serving cell, to retransmit the downlink data. The second serving cell and the first serving cell do not belong to a same cell group.

Optionally, during retransmission manner selection, the base station may package to-be-retransmitted data into a new MAC packet data unit (PDU), That is, for the UE, the new MAC PDU is a newly transmitted data packet. In this case, both a hybrid automatic repeat request (HARQ) identifier and a HARQ entity are updated. Optionally, in this case, a quantity of HARQ retransmission times of the base station accumulates by one. Alternatively, the base station instructs the UE to receive data of a same HARQ entity across carriers. In this case, a quantity of HARQ retransmission times of the base station accumulates by one. Alternatively, RLC retransmission is performed once at a MAC layer of the base station using RLC of the base station. In this case, a quantity of HARQ retransmission times of the base station accumulates by one.

According to the communications method for multi-carrier aggregation provided in this embodiment of the present disclosure, a base station groups N serving cells into K cell groups, sends a cell grouping message to UE, and sends downlink data to the UE using a first serving cell, when the UE has not successfully received the downlink data sent by the base station using the first serving cell, the UE sends NACK information to the base station, and the base station sends the downlink data to the UE using a second serving cell. In this way, downlink data can be retransmitted across carriers, it is avoided that a packet loss ratio is relatively high when retransmission cannot be performed because there is no retransmission resource, and robustness of data transmission is improved.

Figure 12:
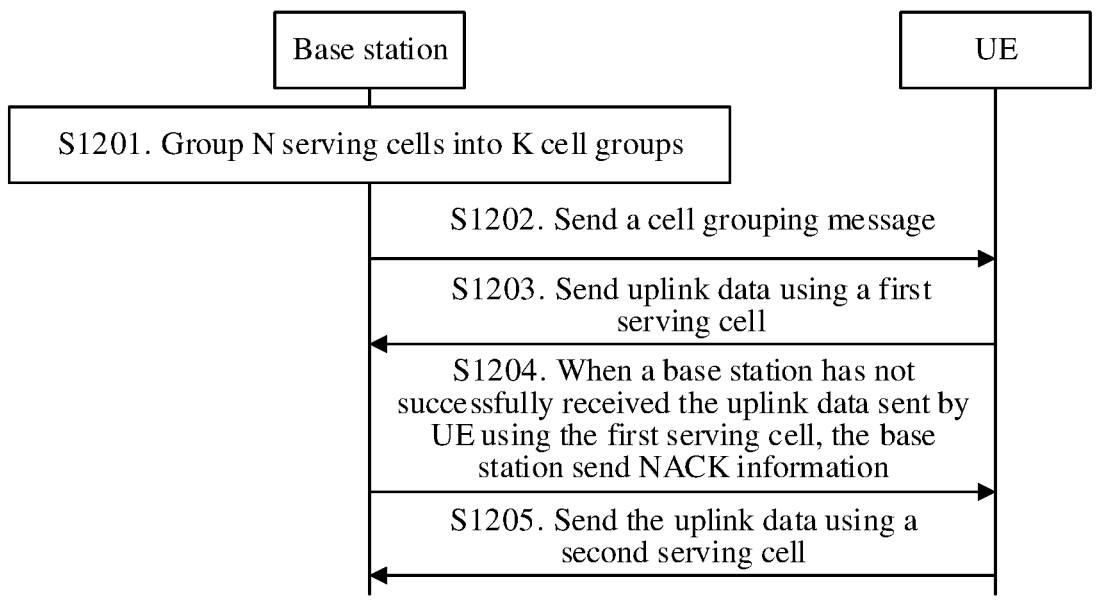
FIG. 12 is a flowchart of Embodiment 12 of a communications method for multi-carrier aggregation according to the present disclosure.

FIG. 12 is a flowchart of Embodiment 12 of a communications method for multi-carrier aggregation according to the present disclosure. As shown in FIG. 12, the method in this embodiment may include the following steps.

Step S1201: A base station groups N serving cells into K cell groups.

Step S1202: The base station sends a cell grouping message to UE.

In this embodiment, for specific implementation processes of steps S1201 and S1202 in this embodiment, refer to the related records in Embodiment 1 or Embodiment 2 of the method of the present disclosure. Details are not described again herein.

Step S1203: The UE sends uplink data to the base station using a first serving cell.

The first serving cell is any serving cell of the N serving cells.

Step S1204: When the base station has not successfully received the uplink data sent by the UE using the first serving cell, the base station sends NACK information to the UE.

In this embodiment, when the base station has not successfully received the downlink data (for example, the base station has not received the uplink data sent by the UE using the first serving cell, or the base station has received the uplink data sent by the UE using the first serving cell, but cannot parse out data) sent by the UE using the first serving cell, the base station sends NACK information to the UE. The NACK information is used to indicate that the base station has not successfully received the uplink data.

Step S1205: The UE sends the uplink data to the base station using a second serving cell.

In this embodiment, optionally, the second serving cell and the first serving cell belong to a same cell group. After receiving the NACK information sent by the base station, the UE may retransmit the uplink data. In a specific implementation process, when the UE needs to retransmit the uplink data, because the first serving cell may have no resource for retransmission, or channel quality of the first serving cell may be relatively poor, the first serving cell is no longer selected for retransmission. The UE retransmits the uplink data using the following two optional methods The UE determines the cell group to which the first serving cell belongs, and selects the second serving cell from the cell group to retransmit the uplink data. In this way, cross-serving-cell retransmission, that is, cross-carrier retransmission can be implemented. One serving cell corresponds to one or more carriers. Optionally, the second serving cell and the first serving cell may belong to different cell groups. The UE may select a serving cell (that is, the second serving cell) according to signal quality and load of each serving cell, to retransmit the uplink data. The second serving cell and the first serving cell do not belong to a same cell group.

Optionally, during retransmission manner selection, the UE may package to-be-retransmitted data into a new MAC PDU. That is, for the base station, the new MAC PDU is a newly transmitted data packet. In this case, both a HARQ identifier and a HARQ entity are updated. Optionally, in this case, a quantity of HARQ retransmission times of the UE accumulates by one. Alternatively, the UE instructs the base station to receive data of a same HARQ entity across carriers. In this case, a quantity of HARQ retransmission times of the UE accumulates by one. Alternatively, RLC retransmission is performed once at a MAC layer of the UE using RLC of the UE. In this case, a quantity of HARQ retransmission times of the UE accumulates by one.

According to the communications method for multi-carrier aggregation provided in this embodiment of the present disclosure, a base station groups N serving cells into K cell groups, and sends a cell grouping message to UE, the UE sends uplink data to the base station using a first serving cell, when the base station has not successfully received the uplink data sent by the UE using the first serving cell, the base station sends NACK information to the UE, and the UE sends the uplink data to the base station using a second serving cell. In this way, uplink data can be retransmitted across carriers, it is avoided that a packet loss ratio is relatively high when retransmission cannot be performed because there is no retransmission resource, and robustness of data transmission is improved.

Figure 13:
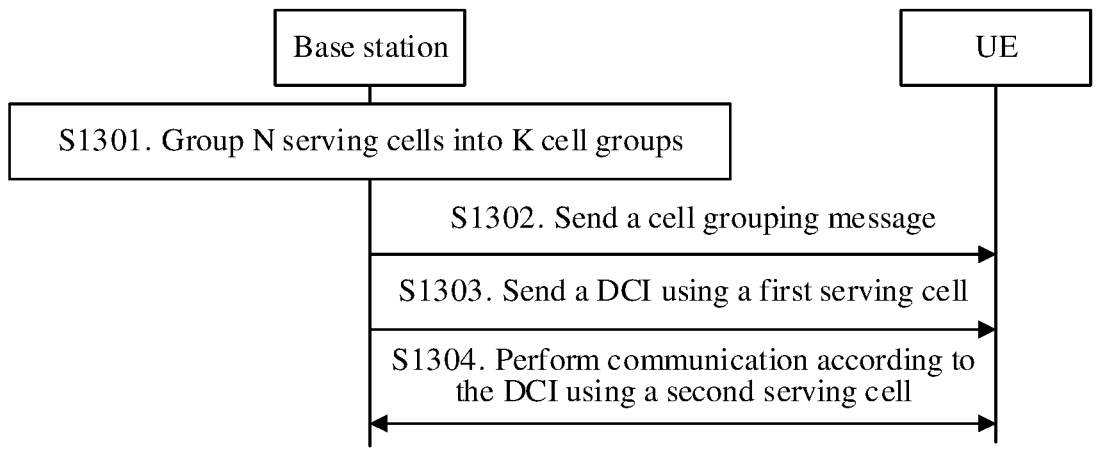
FIG. 13 is a flowchart of Embodiment 13 of a communications method for multi-carrier aggregation according to the present disclosure.

FIG. 13 is a flowchart of Embodiment 13 of a communications method for multi-carrier aggregation according to the present disclosure. As shown in FIG. 13, the method in this embodiment may include the following steps.

Step S1301: A base station groups N serving cells into K cell groups.

Step S1302: The base station sends a cell grouping message to UE.

In this embodiment, for specific implementation processes of steps S1301 and S1302 in this embodiment, refer to the related records in Embodiment 1 or Embodiment 2 of the method of the present disclosure. Details are not described again herein.

Step S1303: The base station sends a DCI to the UE using a first serving cell.

In this embodiment, the first serving cell is any serving cell of the N serving cells, the DCI is used to instruct the UE to communicate with the base station using a second serving cell, and the first serving cell and the second serving cell belong to a same cell group. Further, when the base station sends the DCI to the UE, the base station determines the cell group to which the second serving cell belongs, selects the first serving cell from the cell group, and sends the DCI to the UE using the first serving cell. The DCI may indicate the second serving cell in a manner of a mapping table or an offset manner.

Step S1304: The base station communicates with the UE according to the DCI using a second serving cell.

In this embodiment, after the UE receives the DCI sent by the base station, the base station and the UE communicate with each other according to the DCI using the second serving cell (that is, performs an operation indicated by the DCI). For example, the UE may send uplink data to the base station according to the DCI, and the base station receives, according to the DCI, the uplink data sent by the UE. Alternatively, the base station sends downlink data to the UE according to the DCI, and UE receives, according to the DCI, the downlink data sent by the base station. Alternatively, the base station and UE perform power control and the like according to the DCI.

According to the communications method for multi-carrier aggregation provided in this embodiment, a base station groups N serving cells into K cell groups, sends a cell grouping message to UE, sends DCI to the UE using a first serving cell, and communicates with the UE according to the DCI using a second serving cell. In this way, a carrier corresponding to a serving cell in a cell group can be scheduled using DCI transmitted in another serving cell in the cell group. Therefore, control channel usage of this group is balanced, and a problem that load of control channels of some cells is excessively heavy is resolved.

Figure 14:
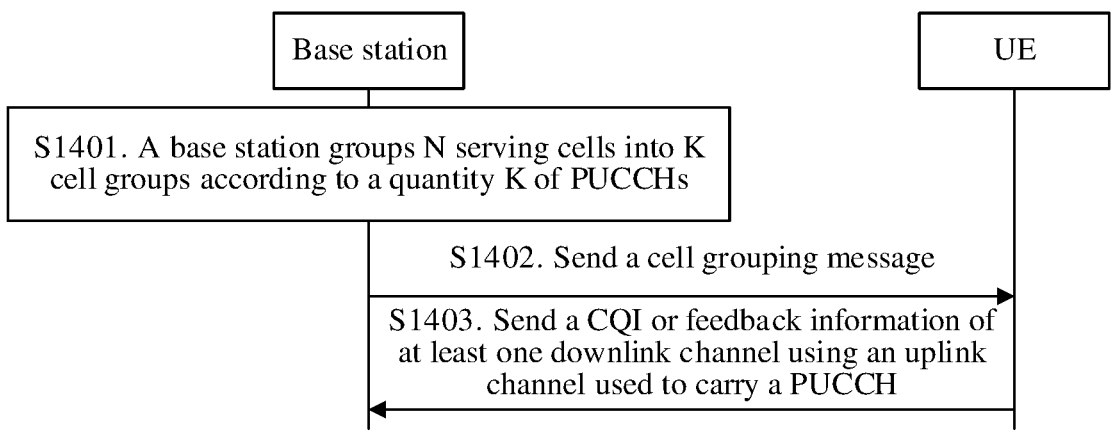
FIG. 14 is a flowchart of Embodiment 14 of a communications method for multi-carrier aggregation according to the present disclosure.

FIG. 14 is a flowchart of Embodiment 14 of a communications method for multi-carrier aggregation according to the present disclosure. As shown in FIG. 14, the method in this embodiment may include the following steps.

Step S1401: A base station groups N serving cells into K cell groups according to a quantity K of PUCCHs.

Step S1402: The base station sends a cell grouping message to UE.

In this embodiment, for specific implementation processes of steps S1401 and S1402 in this embodiment, refer to the related records in Embodiment 1 or Embodiment 2 of the method of the present disclosure. Details are not described again herein.

Step S1403: The UE sends a CQI or feedback information of at least one downlink channel to the base station using an uplink channel used to carry a PUCCH.

In this embodiment, a serving cell corresponding to the uplink channel used to carry the PUCCH and a serving cell corresponding to the at least one downlink channel belongs to a same cell group. Because some cells may have only downlink carriers and have no uplink carriers, these cells have only downlink channels and have no uplink channels between the UE and the base station. As a result, a quantity of downlink channels is greater than or equal to a quantity of uplink channels in some cell groups. To ensure that each downlink channel has uplink feedback, a CQI or feedback information of a downlink channel corresponding to each serving cell in each cell group may be reported to the base station using an uplink channel used to carry a PUCCH in the cell group. Based on the foregoing description, at a same time, the UE may send a CQI or feedback information of at least one downlink channel to the base station using an uplink channel used to carry a PUCCH. The feedback information may include ACK information or NACK information.

According to the communications method for multi-carrier aggregation provided in this embodiment, a base station groups N serving cells into K cell groups according to a quantity K of PUCCHs between the base station and UE, and sends a cell grouping message to the UE, the UE sends a CQI or feedback information of at least one downlink channel to the base station using an uplink channel used to carry a PUCCH. In this way, it can be ensured that a CQI or feedback information of each downlink channel can be reported to the base station.

Figure 15:
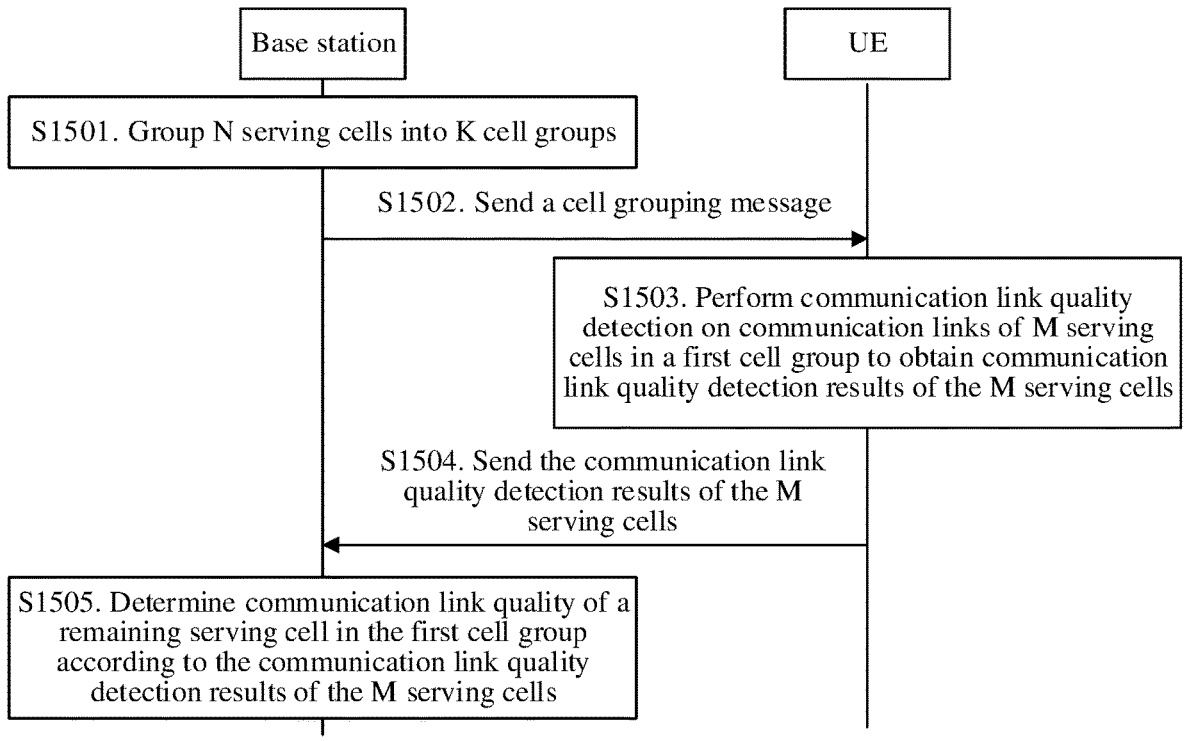
FIG. 15 is a flowchart of Embodiment 15 of a communications method for multi-carrier aggregation according to the present disclosure.

FIG. 15 is a flowchart of Embodiment 15 of a communications method for multi-carrier aggregation according to the present disclosure. As shown in FIG. 15, the method in this embodiment may include the following steps.

Step S1501: A base station groups N serving cells into K cell groups.

Step S1502: The base station sends a cell grouping message to UE.

In this embodiment, for specific implementation processes of steps S1501 and S1502 in this embodiment, refer to the related records in Embodiment 1 or Embodiment 2 of the method of the present disclosure. Details are not described again herein.

Step S1503: The UE performs communication link quality detection on communication links of M serving cells in a first cell group to obtain communication link quality detection results of the M serving cells.

In this embodiment, the UE may perform communication link quality detection on communication links of at least one serving cell in each cell group of the K cell groups. One cell group (referred to as the first cell group) of the K cell groups is used as an example for description herein, and another cell group is similar.

In this embodiment, the UE may perform communication link quality detection on communication links of the M serving cells in the first cell group to obtain the communication link quality detection results of the M serving cells. M is a positive integer less than a quantity of serving cells in the first cell group.

Optionally, communication link quality detection includes, but is not limited to, at least one of the following: whether a downlink channel is out-of-synchronization, whether an uplink channel is out-of-synchronization, whether an SINR of an uplink channel is less than a preset threshold, or whether a SINR of an uplink channel is consecutively less than a preset threshold for H times. H is an integer greater than or equal to one.

Step S1503 is described in detail below.

In a first optional implementation manner, the base station groups the N serving cells into the K cell groups according to a quantity K of PUCCHs in step S1501. For a specific implementation process, refer to the record in the first optional implementation manner in which the base station groups the N serving cells into the K cell groups in Embodiment 1 of the foregoing method in the present disclosure. Details are not described herein again. In this case, in step S1503, the UE performs communication link quality detection on a communication link of a serving cell that carries a PUCCH in the first cell group. Optionally, if a serving cell used to carry a PUCCH and a primary serving cell of the N serving cells belong to a same TA group, but the first cell group does not include the primary serving cell of the N serving cells, the UE does not perform communication link quality detection on a communication link of the serving cell used to carry the PUCCH, or the UE does not perform communication link quality detection on a communication link of each serving cell in the cell group to which the serving cell used to carry the PUCCH belongs. The primary serving cell of the N serving cells works at a primary frequency, and executes an initial RRC establishment process or an RRC reestablishment process, or performs a switching operation in a switching process. Alternatively, a PUCCH and a primary serving cell belong to a system information block (SIB) 2 link, where the SIB2 link indicates that the PUCCH and the primary serving cell of the N serving cells are configured and paired using SIB2. Alternatively, a primary serving cell of the N serving cells is a downlink path loss reference cell of a serving cell used to carry a PUCCH.

In a second optional implementation manner, the base station groups the N serving cells into the K cell groups according to a TA in S1501. Serving cells whose TAs are the same or similar are grouped into a same cell group. In this case, in step S1503, the UE may perform communication link quality detection on a communication link of any serving cell in the first cell group.

In a third optional implementation manner, the UE may perform step S1503 according to an instruction of the base station. Further, before the UE performs step S1503, the base station sends communication link quality detection instruction information to the UE. The communication link quality detection instruction information may be used to instruct the UE to perform communication link quality detection on the communication links of the M serving cells in the first cell group. That is, the communication link quality detection instruction information is used to instruct the UE to perform communication link quality detection on communication links of some serving cells in a cell group. Optionally, the communication link quality detection instruction information may include parameters further detected by the UE, for example, a downlink is out-of-synchronization, an uplink is out-of-synchronization, a SINR of a downlink, or the like. After receiving the communication link quality detection instruction information sent by the base station, the UE performs communication link quality detection on the communication links of the M serving cells in the first cell group according to the communication link quality detection instruction information.

In a fourth optional implementation manner, the UE may perform step S1503 according to an instruction of the base station. Further, before the UE performs step S1503, the base station sends communication link quality detection instruction information to the UE. The communication link quality detection instruction information may be used to instruct the UE to perform communication link quality detection on the communication links of the M serving cells in the first cell group. That is, the communication link quality detection instruction information is used to instruct the UE to perform communication link quality detection on communication links of some serving cells in a cell group. After receiving the communication link quality detection instruction information sent by the base station, the UE performs communication link quality detection on the communication links of the M serving cells in the first cell group according to the communication link quality detection instruction information, and does not perform communication link quality detection on a communication link of another serving cell in the first cell group.

Optionally, after obtaining the communication link quality detection results of the M serving cells, the UE may obtain a link quality detection result of a communication link of a remaining serving cell in the first cell group according to the M communication link quality detection results. Alternatively, the UE may obtain link quality of a communication link of another serving cell in the first cell group according to the other approaches. In this way, the UE can obtain link quality of a communication link of each serving cell in the entire first cell group.

Optionally, after obtaining the communication link quality detection results, the UE may perform step S1504, or may also not send the communication link quality detection results to the base station.

Step S1504: The UE sends the communication link quality detection results of the M serving cells to the base station.

Step S1505: The base station determines communication link quality of a remaining serving cell in the first cell group according to the communication link quality detection results of the M serving cells.

In this embodiment, after obtaining the link quality detection results of the M communication links in the first cell group, the UE reports these results to the base station. Optionally, the base station determines communication link quality of a remaining serving cell in the first cell group according to the M communication link quality detection results. In this way, the base station can obtain link quality of a communication link of each serving cell in the entire first cell group.

Optionally, if the M communication link quality detection results indicate that quality of some communication links is relatively poor, the base station may instruct the UE to stop data transmission on these communication links of relatively poor quality. For example, the base station may instruct, using a cell group release message, the UE to release serving cells of these communication links of relatively poor quality.

For details, refer to the related record in Embodiment 4 of the method of the present disclosure. In this way, the UE stops data transmission to the base station in these serving cells. Alternatively, the base station may instruct, using a cell group deactivation message, the UE to deactivate the serving cells of these communication links of relatively poor quality. For details, refer to the related record in Embodiment 6 or Embodiment 8 of the method of the present disclosure. In this way, the UE stops data transmission to the base station in these serving cells.

Optionally, if the M communication link quality detection results indicate that quality of some communication links is relatively poor, the UE may actively stop data transmission on these communication links of relatively poor quality according to the M communication link quality detection results. Optionally, if downlink timing reference cells or path loss reference cells corresponding to PUCCHs carried in serving cells of these communication links of relatively poor quality do not belong to the first cell group, the UE continues to send uplink data using the serving cells of these communication links of relatively poor quality. That is, the UE stops sending uplink data only when the serving cells of these communication links of relatively poor quality are used as downlink timing reference cells or path loss reference cells.

According to the communications method for multi-carrier aggregation provided in this embodiment of the present disclosure, a base station groups N serving cells into K cell groups, and sends a cell grouping message to UE. The UE performs communication link quality detection on communication links of M serving cells in a first cell group, to obtain communication link quality detection results of the M serving cells, and reports the communication link quality detection results of the M serving cells to the base station. Because the UE needs to perform quality detection only on communication links of some serving cells in a same cell group, operation complexity of the UE can be reduced.

Figure 16:
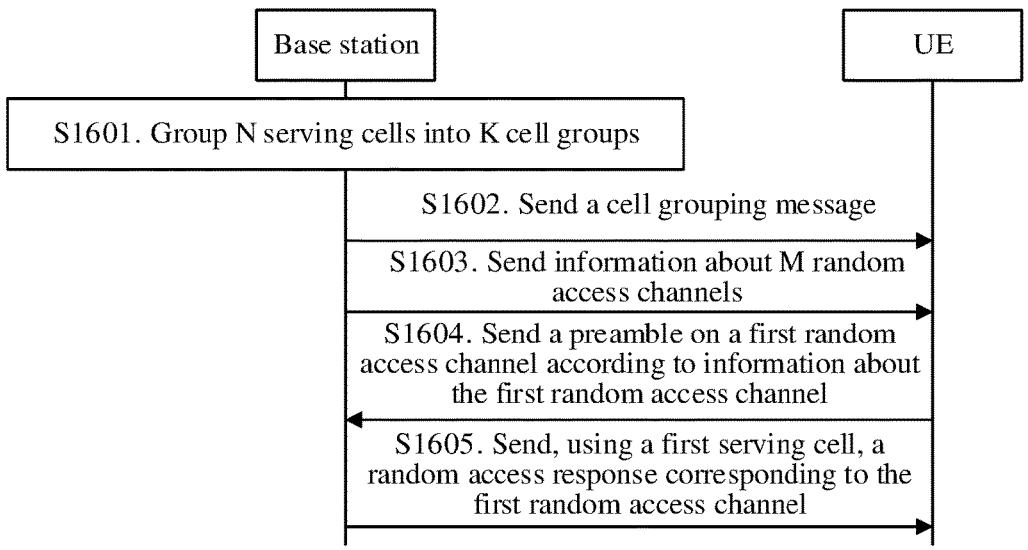
FIG. 16 is a flowchart of Embodiment 16 of a communications method for multi-carrier aggregation according to the present disclosure.

FIG. 16 is a flowchart of Embodiment 16 of a communications method for multi-carrier aggregation according to the present disclosure. As shown in FIG. 16, the method in this embodiment may include the following steps.

Step S1601: A base station groups N serving cells into K cell groups.

Step S1602: The base station sends a cell grouping message to UE.

In this embodiment, for specific implementation processes of steps S1601 and S1602 in this embodiment, refer to the related records in Embodiment 1 or Embodiment 2 of the method of the present disclosure. Details are not described again herein.

Step S1603: The base station sends information about M random access channels to the UE.

In this embodiment, the base station may send information about a random access channel in each of the K cell groups to the UE. In this embodiment, one (for example, the first cell group) of the K cell groups is used as an example, and another cell group is similar. The base station sends the information about the M random access channels in the first cell group to the UE. The M random access channels are respectively random access channels between the UE and the M serving cells in the first cell group. M is a positive integer not greater than a quantity of serving cells in the first cell group. Information about a random access channel may include a time-frequency resource location of a channel, a maximum quantity of random access times, a backoff parameter, or the like.

Step S1604: The UE sends a preamble on a first random access channel according to information about the first random access channel to the base station.

In this embodiment, the UE may send a preamble to the base station according to information about each of the M random access channels. One random access channel (referred to as first random access information) of the M random access channels is used as an example for description herein. Another random access channel is similar, and details are not described herein again. The UE may send a preamble to the base station on the first random access channel according to the information about the first random access channel.

Step S1605: The base station sends, using a first serving cell, a random access response corresponding to the first random access channel to the UE.

In this embodiment, after receiving the preamble sent by the UE on the first random access channel, the base station needs to send the random access response corresponding to the first random access channel to the UE. The base station may select any serving cell in the first cell group to send the random access response corresponding to the first random access channel to the UE. For example, the base station may send the random access response to the UE using a serving cell in which the first random access channel is located. Alternatively, the base station may send the random access response to the UE using another serving cell in the first cell group except the serving cell in which the first random access channel is located. After the UE receives the random access response sent by the base station, a random access process of the UE on the first random access channel is completed.

Optionally, the random access response includes uplink scheduling grant information, and the uplink scheduling grant information is used to instruct the UE to send uplink information using the second serving cell. The second serving cell and the first serving cell belong to a same cell group. That is, the serving cell used to transmit the random access response and the serving cell in which the UE sends the uplink information as instructed by the uplink scheduling grant information are different cells, but belong to the same cell group. The uplink information may be uplink data. After performing step S1605, the UE sends the uplink data to the base station according to the uplink scheduling grant information using the second serving cell. The uplink information may be a message 3. After performing step S1605, the UE sends the message 3 to the base station according to the uplink scheduling grant information using the second serving cell. After receiving the message 3 sent by the UE, the base station sends a message 4 to the UE. In this way, a contention-based random access process of the UE on the first random access channel is completed.

According to the communications method for multi-carrier aggregation provided in this embodiment of the present disclosure, a base station groups N serving cells into K cell groups, sends a cell grouping message to UE, and sends information about M random access channels to the UE. The UE sends a preamble to the base station on a first random access channel according to information about the first random access channel. The base station sends a random access response corresponding to the first random access channel to the UE using a first serving cell. In this way, a random access process of the UE on the first random access channel is completed to implement uplink synchronization.

Figure 17:
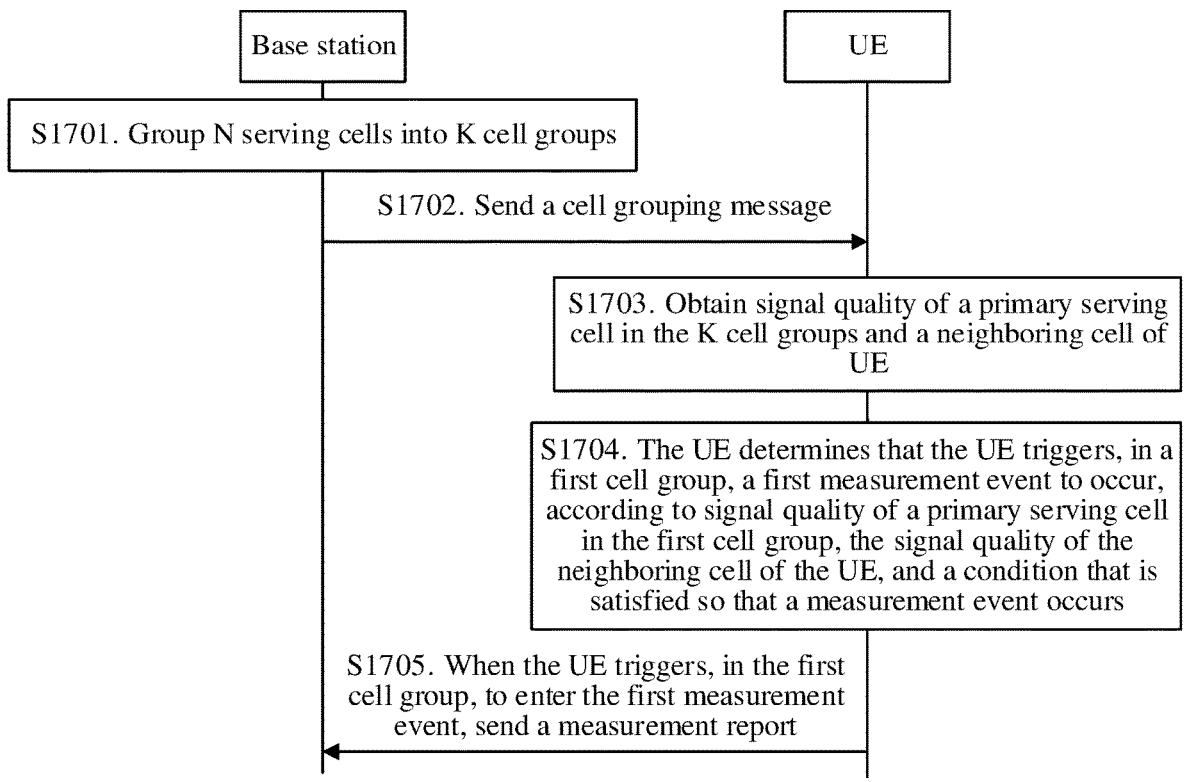
FIG. 17 is a flowchart of Embodiment 17 of a communications method for multi-carrier aggregation according to the present disclosure.

FIG. 17 is a flowchart of Embodiment 17 of a communications method for multi-carrier aggregation according to the present disclosure. As shown in FIG. 17, the method in this embodiment may include the following steps.

Step S1701: A base station groups N serving cells into K cell groups.

Step S1702: The base station sends a cell grouping message to UE.

In this embodiment, for specific implementation processes of steps S1701 and S1702 in this embodiment, refer to the related records in Embodiment 1 or Embodiment 2 of the method of the present disclosure. Details are not described again herein.

Step S1703: The UE obtains signal quality of a primary serving cell in the K cell groups and a neighboring cell of the UE.

In this embodiment, the UE obtains the signal quality of the primary serving cell in the K cell groups and the signal quality of the neighboring cell of the UE. Optionally, a primary serving cell of a cell group may be, for example, a serving cell that is used to carry a PUCCH and that is in the cell group. Alternatively, the primary serving cell of the cell group and a PUCCH in the cell group belong to a SIB2 link, where the SIB2 link indicates that the PUCCH and the primary serving cell of the cell group are configured and paired using SIB2. Alternatively, the primary serving cell of the cell group may be a downlink path loss reference cell of a serving cell used to carry a PUCCH in the cell group. The UE may obtain signal quality of a cell, for example, as follows. The UE samples a reference signal of the cell, when the UE performs sampling for T times, where T indicates a minimum quantity of times that satisfies physical layer measurement precision of the UE, smoothing processing is performed on T sampling results at a physical layer of the UE, to obtain a physical layer measurement value, where the physical layer measurement value is used at an RRC layer of the UE, and smoothing processing is performed again on the physical layer measurement value at the RRC layer of the UE, to obtain signal quality of the cell.

Step S1704: The UE determines that the UE triggers, in a first cell group, a first measurement event to occur, according to signal quality of a primary serving cell in the first cell group, the signal quality of the neighboring cell of the UE, and a condition that is satisfied so that a measurement event occurs.

In this embodiment, that a measurement event occurs includes entering the measurement event or leaving the measurement event. The measurement event is an A1 event, an A2 event, an A3 event, an A4 event, an A5 event, or the like. The UE may determine that the UE triggers, in each cell group, a measurement event to occur, according to signal quality of a primary serving cell in each cell group, the signal quality of the neighboring cell of the UE, and a condition that is satisfied so that a measurement event occurs. One cell group (referred to as the first cell group) of the K cell groups is used as an example for description herein. Another cell group is similar, and details are not described again herein. The UE may determine that the UE triggers, in the first cell group, the first measurement event to occur, according to the signal quality of the primary serving cell in the first cell group, the signal quality of the neighboring cell of the UE, and the condition that is satisfied so that a measurement event occurs. The first measurement event is any one of the foregoing measurement events.

Optionally, the UE may further receive measurement frequency information and a measurement cell list configured by the base station. Only when a neighboring cell at a measurement frequency measured belongs to the measurement cell list, a configured measurement event can be triggered. Otherwise, a corresponding configured measurement event is not triggered. Further, only when the primary serving cell in the first cell group is a secondary cell of the N serving cells, the UE uses the measurement cell list to limit the measurement event. The secondary cell does not include a primary secondary cell (PSCell) configured in a dual connectivity feature.

In the following description, a measurement event is the A3 event.

A condition that is satisfied in order to enter the A3 event is:

$$Mn+Ofn+Ocn-Hys>Mp+Ofp+Ocp+\text{Off};$$

A condition that is satisfied in order to leave the A3 event is:

$$Mn+Ofn+Ocn+Hys<Mp+Ofp+Ocp+\text{Off},$$

where Mn indicates signal quality of a neighboring cell, and no offset is considered, Ofn indicates an offset of a frequency corresponding to a neighboring cell, Ocn indicates a cell offset of a neighboring cell, Mp indicates signal quality of a primary serving cell of a cell group, and no offset is considered, Ofp indicates an offset of a frequency of a primary serving cell of a cell group, Ocp indicates a cell offset of a primary serving cell of a cell group, Hys indicates a hysteresis parameter corresponding to the A3 event, and Off indicates an offset corresponding to the A3 event.

When the UE determines that the condition for entering the A3 event is satisfied, according to the signal quality of the primary serving cell in the first cell group, and the signal quality of the neighboring cell, the UE determines that the UE triggers, in the first cell group, to enter the A3 event. When the UE determines that the condition for leaving the A3 event is satisfied, according to the signal quality of the primary serving cell in the first cell group, and the signal quality of the neighboring cell, the UE determines that the UE triggers, in the first cell group, to leave the A3 event.

In the following description, a measurement event is the A5 event.

A condition 1 that is satisfied in order to enter the A5 event is:

$$Mp+Hys<\text{Thresh1};$$

A condition 2 that is satisfied in order to enter the A5 event is:

$$Mn+Ofn+Ocn-Hys>\text{Thresh 2};$$

A condition 1 that is satisfied in order to leave the A5 event is:

$$Mp-Hys>\text{Thresh1};$$

A condition 2 that is satisfied in order to leave the A5 event is:

$$Mn+Ofn+Ocn+Hys<\text{Thresh 2},$$

where Mp indicates signal quality of a primary serving cell of a cell group, and no offset is considered, Mn indicates signal quality of a neighboring cell, and no offset is considered, Ofn indicates an offset of a frequency corresponding to a neighboring cell, Ocn indicates a cell offset of a neighboring cell, Hys indicates a hysteresis parameter corresponding to the A5 event, Thresh1 indicates a threshold 1 corresponding to the A5 event, and Thresh2 indicates a threshold 2 corresponding to the A5 event.

When the UE determines that the condition 1 for entering the A5 event is satisfied or the condition 2 for entering the A5 event is satisfied, according to the signal quality of the primary serving cell in the first cell group, and the signal quality of the neighboring cell, the UE determines that the UE triggers, in the first cell group, to enter the A5 event. When the UE determines that the condition 1 for leaving the A5 event is satisfied or the condition 2 for leaving the A5 event is satisfied, according to the signal quality of the primary serving cell in the first cell group, and the signal quality of the neighboring cell, the UE determines that the UE triggers, in the first cell group, to leave the A5 event.

Step S1705: When the UE triggers, in the first cell group, to enter the first measurement event, the UE sends a measurement report to the base station.

In this embodiment, the UE determines that the UE triggers, in the first cell group, the first measurement event to occur. If the UE determines that triggering, in the first cell group, the first measurement event to occur is triggering to leave the first measurement event, the UE generates no measurement report. If the UE determines that triggering, in the first cell group, the first measurement event to occur is triggering to enter the first measurement event, the UE generates the measurement report, where the measurement report is used to indicate that the UE triggers, in the first cell group, to enter the first measurement event, and the UE then reports the generated measurement report to the base station.

According to the communications method for multi-carrier aggregation provided in this embodiment of the present disclosure, a base station groups N serving cells into K cell groups, and sends a cell grouping message to UE. The UE obtains signal quality of a primary serving cell in the K cell groups and a neighboring cell of the UE, determines that the UE triggers, in a first cell group, a first measurement event to occur, according to signal quality of a primary serving cell in the first cell group, the signal quality of the neighboring cell of the UE, and a condition that is satisfied so that a measurement event occurs, when the UE triggers, in the first cell group, to enter the first measurement event, the UE sends a measurement report to the base station. In this way, it is avoided that a primary serving cell in a cell group cannot be measured in some measurement scenarios.

It should be noted that the foregoing cell may be represented by a specific physical concept such as a signal coverage area, a network side, a base station, a carrier, or a carrier frequency. This is not limited in the present disclosure.

Figure 18:
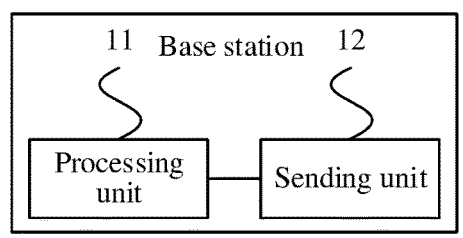
FIG. 18 is a schematic structural diagram of Embodiment 1 of a base station according to the present disclosure.

FIG. 18 is a schematic structural diagram of Embodiment 1 of a base station according to the present disclosure. As shown in FIG. 18, the base station in this embodiment may include a processing unit 11 and a sending unit 12. The processing unit 11 is configured to group N serving cells into K cell groups, where N is a positive integer greater than one, and K is a positive integer less than N. The sending unit 12 is configured to send a cell grouping message to UE, where the cell grouping message is used to indicate that the N serving cells are grouped into the K cell groups. The processing unit 11 is further configured to communicate with the UE according to the K cell groups.

Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups.

Optionally, the processing unit 11 may group the N serving cells into the K cell groups in the following optional implementation solutions.

In a first optional implementation solution, when grouping the N serving cells into the K cell groups, the processing unit 11 is further configured to group the N serving cells into the K cell groups according to a quantity K of PUCCHs. The K cell groups correspond to the K PUCCHs, and each cell group includes a serving cell used to carry a PUCCH.

In a second optional implementation solution, when grouping the N serving cells into the K cell groups, the processing unit 11 is further configured to group the serving cells into a licensed carrier cell group or an unlicensed carrier cell group according to types of carriers used in the serving cells, where a carrier used in a serving cell included in the licensed carrier cell group is a licensed carrier, and a carrier used in a serving cell included in the unlicensed carrier cell group is an unlicensed carrier.

In a third optional implementation solution, when grouping the N serving cells into the K cell groups, the processing unit 11 is further configured to group the N serving cells into the K cell groups according to a TA, where serving cells whose TAs are the same belong to a same cell group.

In a fourth optional implementation solution, when grouping the N serving cells into the K cell groups, the processing unit 11 is further configured to group the N serving cells into the K cell groups according to signal quality. Optionally, when grouping the N serving cells into the K cell groups according to signal quality, the processing unit 11 is further configured to group the N serving cells into a first cell group and a second cell group according to signal quality and a preset threshold, where signal quality of a serving cell included in the first cell group is greater than the preset threshold, and signal quality of a serving cell included in the second cell group is not greater than the preset threshold.

In a fifth optional implementation solution, when grouping the N serving cells into the K cell groups, the processing unit 11 is further configured to group the N serving cells into the K cell groups according to that serving cells that transmit scheduling commands using a same serving cell and the serving cell that is used to transmit the scheduling commands belong to a same cell group.

In a sixth optional implementation solution, when grouping the N serving cells into the K cell groups, the processing unit 11 is further configured to group the N serving cells into the K cell groups according to that serving cells whose DRX configuration parameters are the same belong to a same cell group, where the DRX configuration parameter includes at least one of DRX duration, a DRX inactivity timer, a DRX retransmission timer, a long DRX cycle offset, a short DRX cycle, or a DRX short cycle.

Optionally, the processing unit 11 may be configured to communicate with the UE according to the K cell groups in the following optional implementation solutions.

In a first optional implementation solution, when communicating with the UE according to the K cell groups, the processing unit 11 is further configured to send a cell group modification message to the UE, where the cell group modification message includes an identifier of a to-be-modified cell group and an identifier of a cell included in a modified cell group, and the to-be-modified cell group is at least one cell group of the K cell groups.

In a second optional implementation solution, when communicating with the UE according to the K cell groups, the processing unit 11 is further configured to send a cell group release message to the UE, where the cell group release message includes an identifier of a to-be-released cell group, and the to-be-released cell group is at least one cell group of the K cell groups.

In a third optional implementation solution, when communicating with the UE according to the K cell groups, the processing unit 11 is further configured to send a cell group activation message to the UE, where the cell group activation message includes an identifier of a to-be-activated cell group, and the to-be-activated cell group is at least one cell group of the K cell groups.

In a fourth optional implementation solution, when communicating with the UE according to the K cell groups, the processing unit 11 is further configured to send a cell group activation message to the UE, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs.

In a fifth optional implementation solution, when communicating with the UE according to the K cell groups, the processing unit 11 is further configured to send a cell group deactivation message to the UE, where the cell group deactivation message is used to indicate a to-be-deactivated cell group, and the to-be-deactivated cell group is at least one cell group of the K cell groups.

In a sixth optional implementation solution, when communicating with the UE according to the K cell groups, the processing unit 11 is further configured to send a cell group deactivation message to the UE, where the cell group deactivation message is used to indicate a to-be-deactivated cell group and a to-be-deactivated serving cell in the to-be-activated cell group, the to-be-deactivated cell group is at least one cell group of the K cell groups, and the to-be-deactivated serving cell is at least one serving cell in the cell group to which the to-be-deactivated serving cell belongs.

In a seventh optional implementation solution, when communicating with the UE according to the K cell groups, the processing unit 11 is further configured to receive a CQI or feedback information, sent by the UE, of at least one downlink channel using an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

In an eighth optional implementation solution, when communicating with the UE according to the K cell groups, the processing unit 11 is further configured to communicate with the UE according to a DRX working mode using a serving cell in the licensed cell group, or communicate with the UE according to a working mode in which DRX is not configured and using a serving cell in the unlicensed cell group.

In a ninth optional implementation solution, when communicating with the UE according to the K cell groups, the processing unit 11 is further configured to communicate with the UE using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

In a tenth optional implementation solution, when communicating with the UE according to the K cell groups, the processing unit 11 is further configured to send downlink data to the UE using a first serving cell, where the first serving cell is any serving cell of the N serving cells, receive NACK information sent by the UE, where the NACK information indicates that the UE has not received the downlink data successfully, and send the downlink data to the UE using a second serving cell.

In an eleventh optional implementation solution, when communicating with the UE according to the K cell groups, the processing unit 11 is further configured to when the base station has not successfully received uplink data sent by the UE using a first serving cell, send NACK information to the UE, where the NACK information is used to indicate that the base station has not successfully received the uplink data sent by the base station using the first serving cell, and the first serving cell is any serving cell of the N serving cells, and receive the uplink data sent by the UE using a second serving cell.

In a twelfth optional implementation solution, when communicating with the UE according to the K cell groups, the processing unit 11 is further configured to send DCI to the UE using a first serving cell, where the first serving cell is any serving cell of the N serving cells, the DCI is used to instruct the UE to communicate with the base station using a second serving cell, and the first serving cell and the second serving cell belong to a same cell group, and communicate with the UE according to the DCI using the second serving cell.

In a thirteenth optional implementation solution, when communicating with the UE according to the K cell groups, the processing unit 11 is further configured to receive communication link quality detection results, sent by the UE, of M serving cells in a first cell group, where the first cell group is any cell group of the K cell groups, and M is a positive integer less than a quantity of serving cells in the first cell group, and determine communication link quality of a remaining serving cell in the first cell group according to the communication link quality detection results of the M serving cells. Optionally, the communication link quality detection includes, but is not limited to, one of the following or a combination thereof whether a downlink channel is out-of-synchronization, whether an uplink channel is out-of-synchronization, an SINR of an uplink channel, or a radio link failure.

Optionally, before the processing unit 11 receives the communication link quality detection results, sent by the UE, of the M serving cells in the first cell group, the sending unit 12 is further configured to send communication link quality detection instruction information to the UE, where the communication link quality detection instruction information is used to instruct the UE to perform communication link quality detection on communication links of the M serving cells in the first cell group.

In a fourteenth optional implementation solution, when communicating with the UE according to the K cell groups, the processing unit 11 is further configured to send information about M random access channels to the UE, where the M random access channels are respectively random access channels between the UE and M serving cells in a first cell group, the first cell group is any cell group of the K cell groups, and M is a positive integer not greater than a quantity of serving cells in the first cell group, receive a preamble sent by the UE on a first random access channel according to information about the first random access channel, where the first random access channel is any random access channel of the M random access channels, and send, using a first serving cell, a random access response corresponding to the first random access channel to the UE, where the first serving cell is any serving cell in the first cell group.

Optionally, the random access response includes uplink scheduling grant information, the uplink scheduling grant information is used to instruct the UE to send uplink information in a second serving cell, and the second serving cell and the first serving cell belong to a same cell group, and the processing unit 11 is further configured to receive, according to the uplink scheduling grant information using the second serving cell, the uplink information sent by the UE.

In a fifteenth optional implementation solution, when communicating with the UE according to the K cell groups, the processing unit 11 is further configured to receive a measurement report sent by the UE, where the measurement report is used to indicate that the UE triggers, in a first cell group, to enter a first measurement event, the first cell group is any cell group of the K cell groups, and the first measurement event is any one of measurement events.

The base station in this embodiment may be configured to execute the technical solutions executed by a base station in the foregoing method embodiments of the present disclosure. An implementation principle and a technical effect thereof are similar, and details are not described herein again.

Figure 19:
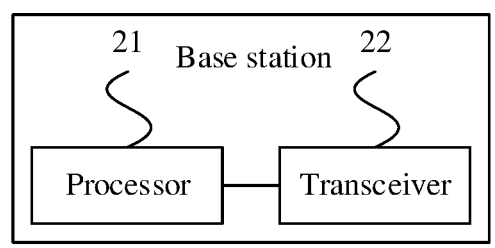
FIG. 19 is a schematic structural diagram of Embodiment 2 of a base station according to the present disclosure.

FIG. 19 is a schematic structural diagram of Embodiment 2 of a base station according to the present disclosure. As shown in FIG. 19, the base station in this embodiment may include a processor 21 and a transceiver 22. The processor 21 is configured to group N serving cells into K cell groups, where N is a positive integer greater than one, and K is a positive integer less than N, send a cell grouping message to UE using the transceiver 22, where the cell grouping message is used to indicate that the N serving cells are grouped into the K cell groups, and communicate with the UE according to the K cell groups.

Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups.

Optionally, the processor 21 may group the N serving cells into the K cell groups in the following optional implementation solutions.

In a first optional implementation solution, when grouping the N serving cells into the K cell groups, the processor 21 is further configured to group the N serving cells into the K cell groups according to a quantity K of PUCCHs. The K cell groups correspond to the K PUCCHs, and each cell group includes a serving cell used to carry a PUCCH.

In a second optional implementation solution, when grouping the N serving cells into the K cell groups, the processor 21 is further configured to group the serving cells into a licensed carrier cell group or an unlicensed carrier cell group according to types of carriers used in the serving cells, where a carrier used in a serving cell included in the licensed carrier cell group is a licensed carrier, and a carrier used in a serving cell included in the unlicensed carrier cell group is an unlicensed carrier.

In a third optional implementation solution, when grouping the N serving cells into the K cell groups, the processor 21 is further configured to group the N serving cells into the K cell groups according to a TA, where serving cells whose TAs are the same belong to a same cell group.

In a fourth optional implementation solution, when grouping the N serving cells into the K cell groups, the processor 21 is further configured to group the N serving cells into the K cell groups according to signal quality. Optionally, when grouping the N serving cells into the K cell groups according to signal quality, the processor 21 is further configured to group the N serving cells into a first cell group and a second cell group according to signal quality and a preset threshold, where signal quality of a serving cell included in the first cell group is greater than the preset threshold, and signal quality of a serving cell included in the second cell group is not greater than the preset threshold.

In a fifth optional implementation solution, when grouping the N serving cells into the K cell groups, the processor 21 is further configured to group the N serving cells into the K cell groups according to that serving cells that transmit scheduling commands using a same serving cell and the serving cell that is used to transmit the scheduling commands belong to a same cell group.

In a sixth optional implementation solution, when grouping the N serving cells into the K cell groups, the processor 21 is further configured to group the N serving cells into the K cell groups according to that serving cells whose DRX configuration parameters are the same belong to a same cell group, where the DRX configuration parameter includes at least one of DRX duration, a DRX inactivity timer, a DRX retransmission timer, a long DRX cycle offset, a short DRX cycle, or a DRX short cycle.

Optionally, the processor 21 may be configured to communicate with the UE according to the K cell groups in the following optional implementation solutions.

In a first optional implementation solution, when communicating with the UE according to the K cell groups, the processor 21 is further configured to send a cell group modification message to the UE using the transceiver 22, where the cell group modification message includes an identifier of a to-be-modified cell group and an identifier of a cell included in a modified cell group, and the to-be-modified cell group is at least one cell group of the K cell groups.

In a second optional implementation solution, when communicating with the UE according to the K cell groups, the processor 21 is further configured to send a cell group release message to the UE using the transceiver 22, where the cell group release message includes an identifier of a to-be-released cell group, and the to-be-released cell group is at least one cell group of the K cell groups.

In a third optional implementation solution, when communicating with the UE according to the K cell groups, the processor 21 is further configured to send a cell group activation message to the UE using the transceiver 22, where the cell group activation message includes an identifier of a to-be-activated cell group, and the to-be-activated cell group is at least one cell group of the K cell groups.

In a fourth optional implementation solution, when communicating with the UE according to the K cell groups, the processor 21 is further configured to send a cell group activation message to the UE using the transceiver 22, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs.

In a fifth optional implementation solution, when communicating with the UE according to the K cell groups, the processor 21 is further configured to send a cell group deactivation message to the UE using the transceiver 22, where the cell group deactivation message includes an identifier of a to-be-deactivated cell group, and the to-be-deactivated cell group is at least one cell group of the K cell groups.

In a sixth optional implementation solution, when communicating with the UE according to the K cell groups, the processor 21 is further configured to send a cell group deactivation message to the UE using the transceiver 22, where the cell group deactivation message is used to indicate a to-be-deactivated cell group and a to-be-deactivated serving cell in the to-be-activated cell group, the to-be-deactivated cell group is at least one cell group of the K cell groups, and the to-be-deactivated serving cell is at least one serving cell in the cell group to which the to-be-deactivated serving cell belongs.

In a seventh optional implementation solution, when communicating with the UE according to the K cell groups, the processor 21 is further configured to receive a CQI or feedback information, sent by the UE, of at least one downlink channel using the transceiver 22 and an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

In an eighth optional implementation solution, when communicating with the UE according to the K cell groups, the processor 21 is further configured to communicate with the UE according to a DRX working mode using a serving cell in the licensed cell group, or communicate with the UE according to a working mode in which DRX is not configured and using a serving cell in the unlicensed cell group.

In a ninth optional implementation solution, when communicating with the UE according to the K cell groups, the processor 21 is further configured to communicate with the UE using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

In a tenth optional implementation solution, when communicating with the UE according to the K cell groups, the processor 21 is further configured to send downlink data to the UE using a first serving cell and the transceiver 22, where the first serving cell is any serving cell of the N serving cells, receive, using the transceiver 22, NACK information sent by the UE, where the NACK information indicates that the UE has not received the downlink data successfully, and send the downlink data to the UE using a second serving cell and the transceiver 22.

In an eleventh optional implementation solution, when communicating with the UE according to the K cell groups, the processor 21 is further configured to when the base station has not successfully received uplink data sent by the UE using a first serving cell, send NACK information to the UE using the transceiver 22, where the NACK information is used to indicate that the base station has not successfully received the uplink data sent by the base station using the first serving cell, and the first serving cell is any serving cell of the N serving cells, and receive, using the transceiver 22, the uplink data sent by the UE using a second serving cell.

In a twelfth optional implementation solution, when communicating with the UE according to the K cell groups, the processor 21 is further configured to send DCI to the UE using a first serving cell and the transceiver 22, where the first serving cell is any serving cell of the N serving cells, the DCI is used to instruct the UE to communicate with the base station using a second serving cell, and the first serving cell and the second serving cell belong to a same cell group, and communicate with the UE according to the DCI using the second serving cell.

In a thirteenth optional implementation solution, when communicating with the UE according to the K cell groups, the processor 21 is further configured to receive communication link quality detection results, sent by the UE, of M serving cells in a first cell group using the transceiver 22, where the first cell group is any cell group of the K cell groups, and M is a positive integer less than a quantity of serving cells in the first cell group, and determine communication link quality of a remaining serving cell in the first cell group according to the communication link quality detection results of the M serving cells. Optionally, the communication link quality detection includes, but is not limited to, one of the following or a combination thereof: whether a downlink channel is out-of-synchronization, whether an uplink channel is out-of-synchronization, an SINR of an uplink channel, or a radio link failure.

Optionally, before the processor 21 receives the communication link quality detection results, sent by the UE, of the M serving cells in the first cell group using the transceiver 22, the processor 21 is further configured to send communication link quality detection instruction information to the UE using the transceiver 22, where the communication link quality detection instruction information is used to instruct the UE to perform communication link quality detection on communication links of the M serving cells in the first cell group.

In a fourteenth optional implementation solution, when communicating with the UE according to the K cell groups, the processor 21 is further configured to send information about M random access channels to the UE, where the M random access channels are respectively random access channels between the UE and M serving cells in a first cell group, the first cell group is any cell group of the K cell groups, and M is a positive integer not greater than a quantity of serving cells in the first cell group, receive a preamble sent by the UE on a first random access channel according to information about the first random access channel, where the first random access channel is any random access channel of the M random access channels, and send, using a first serving cell, a random access response corresponding to the first random access channel to the UE, where the first serving cell is any serving cell in the first cell group.

Optionally, the random access response includes uplink scheduling grant information, the uplink scheduling grant information is used to instruct the UE to send uplink information in a second serving cell, and the second serving cell and the first serving cell belong to a same cell group, and the processor 21 is further configured to receive, according to the uplink scheduling grant information using the second serving cell and the transceiver 22, the uplink information sent by the UE.

In a fifteenth optional implementation solution, when communicating with the UE according to the K cell groups, the processor 21 is further configured to receive, using the transceiver 22, a measurement report sent by the UE, where the measurement report is used to indicate that the UE triggers, in a first cell group, to enter a first measurement event, the first cell group is any cell group of the K cell groups, and the first measurement event is any one of measurement events.

The base station in this embodiment may be configured to execute the technical solutions executed by a base station in the foregoing method embodiments of the present disclosure. An implementation principle and a technical effect thereof are similar, and details are not described herein again.

Figure 20:
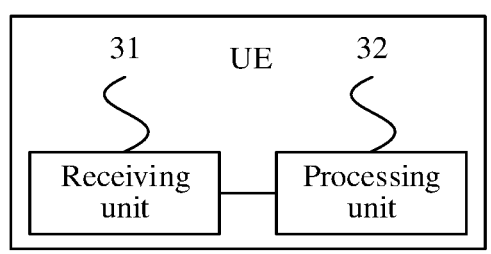
FIG. 20 is a schematic structural diagram of Embodiment 1 of UE according to the present disclosure.

FIG. 20 is a schematic structural diagram of Embodiment 1 of UE according to the present disclosure. As shown in FIG. 20, the UE in this embodiment may include a receiving unit 31 and a processing unit 32. The receiving unit 31 is configured to receive a cell grouping message sent by a base station, where the cell grouping message is used to indicate that N serving cells are grouped into K cell groups, N is an integer greater than 0, and K is an integer less than N. The processing unit 32 is configured to communicate with the base station according to the K cell groups.

Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups.

Optionally, the processing unit 32 may be configured to communicate with the base station according to the K cell groups in the following optional implementation solutions.

In a first optional implementation solution, when communicating with the base station according to the K cell groups, the processing unit 32 is further configured to receive a cell group modification message sent by the base station, where the cell group modification message includes an identifier of a to-be-modified cell group and an identifier of a serving cell included in a modified cell group, and the to-be-modified cell group is at least one cell group of the K cell groups, and update the to-be-modified cell group according to the cell group modification message.

In a second optional implementation solution, when communicating with the base station according to the K cell groups, the processing unit 32 is further configured to receive a cell group release message sent by the base station, where the cell group release message includes an identifier of a to-be-released cell group, and the to-be-released cell group is at least one cell group of the K cell groups, and release a serving cell in the to-be-released cell group according to the cell group release message.

In a third optional implementation solution, when communicating with the base station according to the K cell groups, the processing unit 32 is further configured to receive a cell group activation message sent by the base station, where the cell group activation message is used to indicate a to-be-activated cell group, and the to-be-activated cell group is at least one cell group of the K cell groups, and activate a serving cell in the to-be-activated cell group according to the cell group activation message.

In a fourth optional implementation solution, when communicating with the base station according to the K cell groups, the processing unit 32 is further configured to receive a cell group activation message sent by the base station, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs, and activate a to-be-activated serving cell in the to-be-activated cell group according to the cell group activation message.

In a fifth optional implementation solution, when communicating with the base station according to the K cell groups, the processing unit 32 is further configured to receive a cell group deactivation message sent by the base station, where the cell group deactivation message is used to indicate a to-be-deactivated cell group, and the to-be-deactivated cell group is at least one cell group of the K cell groups, and deactivate a serving cell in the to-be-deactivated cell group according to the cell group deactivation message.

In a sixth optional implementation solution, when communicating with the base station according to the K cell groups, the processing unit 32 is further configured to receive a cell group deactivation message sent by the base station, where the cell group deactivation message is used to indicate a to-be-deactivated cell group and a to-be-deactivated serving cell in the to-be-deactivated cell group, the to-be-deactivated cell group is at least one cell group of the K cell groups, and the to-be-deactivated serving cell is at least one serving cell in the cell group to which the to-be-deactivated serving cell belongs, and deactivate a to-be-deactivated serving cell in the to-be-deactivated cell group according to the cell group deactivation message.

In a seventh optional implementation solution, when communicating with the base station according to the K cell groups, the processing unit 32 is further configured to send a CQI or feedback information of at least one downlink channel to the base station using an uplink channel used to carry a PUCCH, where a serving cell corresponding to the uplink channel used to carry the PUCCH and a serving cell corresponding to the at least one downlink channel belong to a same cell group, and the feedback information includes ACK information or NACK information.

Optionally, when the N serving cells are grouped into a licensed carrier cell group and an unlicensed carrier cell group, a carrier used in a serving cell included in the licensed carrier cell is a licensed carrier, and a carrier used in a serving cell included in the unlicensed carrier cell is an unlicensed carrier, and when communicating with the base station according to the K cell groups, the processing unit 32 is further configured to communicate with the base station according to a DRX working mode using a serving cell in the licensed carrier cell group, or communicate with the base station according to a working mode in which DRX is not configured and using a serving cell in the unlicensed carrier cell group.

In an eighth optional implementation solution, when communicating with the base station according to the K cell groups, the processing unit 32 is further configured to communicate with the base station using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

In a ninth optional implementation solution, when communicating with the base station according to the K cell groups, the processing unit 32 is further configured to send NACK information to the base station when the UE has not successfully received downlink data sent by the base station using a first serving cell, where the NACK information indicates that the UE has not successfully received the downlink data, and the first serving cell is any serving cell of the N serving cells, and receive, using a second serving cell, the downlink data sent by the base station.

In a tenth optional implementation solution, when communicating with the base station according to the K cell groups, the processing unit 32 is further configured to send uplink data to the base station using a first serving cell, where the first serving cell is any serving cell of the N serving cells, receive NACK information sent by the base station, where the NACK information is used to indicate that the base station has not successfully received the uplink data, and send the uplink data to the base station using a second serving cell.

In an eleventh optional implementation solution, when communicating with the base station according to the K cell groups, the processing unit 32 is further configured to receive, using a first serving cell, a DCI sent by the base station, where the first serving cell is any serving cell of the N serving cells, the DCI is used to instruct the UE to communicate with the base station using a second serving cell, and the first serving cell and the second serving cell belong to a same cell group, and communicate with the base station according to the DCI using the second serving cell.

In a twelfth optional implementation solution, when communicating with the base station according to the K cell groups, the processing unit 32 is further configured to perform communication link quality detection on communication links of M serving cells in a first cell group, to obtain communication link quality detection results of the M serving cells, where M is a positive integer less than a quantity of serving cells in the first cell group, and the first cell group is any cell group of the K cell groups, and send the communication link quality detection results of the M serving cells to the base station.

Optionally, the communication link quality detection includes, but is not limited to, at least one of the following: whether a downlink channel is out-of-synchronization, whether an uplink channel is out-of-synchronization, an SINR of an uplink channel, or a radio link failure.

In a thirteenth optional implementation solution, before the processing unit 32 performs communication link quality detection on the communication links of the M serving cells in the first cell group, the receiving unit 31 is further configured to receive communication link quality detection instruction information sent by the base station, where the communication link quality detection instruction information is used to instruct the UE to perform communication link quality detection on the communication links of the M serving cells in the first cell group, and when performing communication link quality detection on the communication links of the M serving cells in the first cell group, to obtain the communication link quality detection results of the M serving cells, the processing unit 32 is further configured to perform communication link quality detection on the communication links of the M serving cells in the first cell group according to the communication link quality detection instruction information, to obtain the communication link quality detection results of the M serving cells.

In a fourteenth optional implementation solution, when communicating with the base station according to the K cell groups, the processing unit 32 is further configured to receive information about M random access channels that is sent by the base station, where the M random access channels are respectively random access channels between the UE and M serving cells in a first cell group, the first cell group is any cell group of the K cell groups, and M is a positive integer not greater than a quantity of serving cells in the first cell group, send a preamble to the base station on a first random access channel according to information about the first random access channel, where the first random access channel is any random access channel of the M random access channels, and receive, using a first serving cell, a random access response that corresponds to the first random access channel and that is sent by the base station, where the first serving cell is any serving cell in the first cell group.

Optionally, the random access response includes uplink scheduling grant information, the uplink scheduling grant information is used to instruct the UE to send uplink information in a second serving cell, and the second serving cell and the first serving cell belong to a same cell group. The processing unit 32 is further configured to send the uplink information to the base station according to the uplink scheduling grant information using the second serving cell.

In a fifteenth optional implementation solution, when communicating with the base station according to the K cell groups, the processing unit 32 is further configured to obtain signal quality of a primary serving cell in the K cell groups and a neighboring cell of the UE, where the primary serving cell is a serving cell that transmits control signaling and that is in a cell group to which the primary serving cell belongs, determine that the UE triggers, in a first cell group, a first measurement event to occur, according to signal quality of a primary serving cell in the first cell group, the signal quality of the neighboring cell of the UE, and a condition that is satisfied so that a measurement event occurs, where triggering the first measurement event to occur includes triggering to enter the first measurement event or triggering to leave the first measurement event, and the first measurement event is any one of measurement events, and when triggering, by the UE in the first cell group, the first measurement event to occur is triggering to enter the first measurement event, send a measurement report to the base station, where the measurement report is used to indicate that the UE triggers, in the first cell group, to enter the first measurement event.

The UE in this embodiment may be configured to execute the technical solutions executed by UE in the foregoing method embodiments of the present disclosure. An implementation principle and a technical effect thereof are similar, and details are not described herein again.

Figure 21:
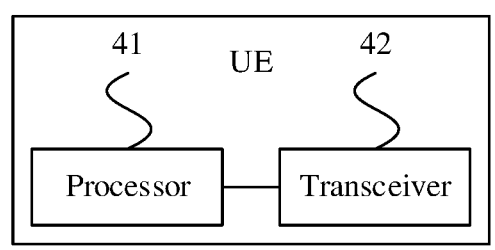
FIG. 21 is a schematic structural diagram of Embodiment 2 of UE according to the present disclosure.

FIG. 21 is a schematic structural diagram of Embodiment 2 of UE according to the present disclosure. As shown in FIG. 21, the UE in this embodiment may include a processor 41 and a transceiver 42. The processor 41 is configured to receive, using the transceiver 42, a cell grouping message sent by a base station, where the cell grouping message is used to indicate that N serving cells are grouped into K cell groups, N is an integer greater than 0, and K is an integer less than N, and communicate with the base station according to the K cell groups.

Optionally, the cell grouping message includes identifiers of the K cell groups, and an identifier of a serving cell included in each cell group. The cell grouping message is used to indicate that the serving cells corresponding to identifiers of the N serving cells are grouped into the cell groups corresponding to the identifiers of the K cell groups.

Optionally, the processor 41 may be configured to communicate with the base station according to the K cell groups in the following optional implementation solutions.

In a first optional implementation solution, when communicating with the base station according to the K cell groups, the processor 41 is further configured to receive, using the transceiver 42, a cell group modification message sent by the base station, where the cell group modification message includes an identifier of a to-be-modified cell group and an identifier of a serving cell included in a modified cell group, and the to-be-modified cell group is at least one cell group of the K cell groups, and update the to-be-modified cell group according to the cell group modification message.

In a second optional implementation solution, when communicating with the base station according to the K cell groups, the processor 41 is further configured to receive, using the transceiver 42, a cell group release message sent by the base station, where the cell group release message includes an identifier of a to-be-released cell group, and the to-be-released cell group is at least one cell group of the K cell groups, and release a serving cell in the to-be-released cell group according to the cell group release message.

In a third optional implementation solution, when communicating with the base station according to the K cell groups, the processor 41 is further configured to receive, using the transceiver 42, a cell group activation message sent by the base station, where the cell group activation message is used to indicate a to-be-activated cell group, and the to-be-activated cell group is at least one cell group of the K cell groups, and activate a serving cell in the to-be-activated cell group according to the cell group activation message.

In a fourth optional implementation solution, when communicating with the base station according to the K cell groups, the processor 41 is further configured to receive, using the transceiver 42, a cell group activation message sent by the base station, where the cell group activation message is used to indicate a to-be-activated cell group and a to-be-activated serving cell in the to-be-activated cell group, the to-be-activated cell group is at least one cell group of the K cell groups, and the to-be-activated serving cell is at least one serving cell in the cell group to which the to-be-activated serving cell belongs, and activate a to-be-activated serving cell in the to-be-activated cell group according to the cell group activation message.

In a fifth optional implementation solution, when communicating with the base station according to the K cell groups, the processor 41 is further configured to receive, using the transceiver 42, a cell group deactivation message sent by the base station, where the cell group deactivation message is used to indicate a to-be-deactivated cell group, and the to-be-deactivated cell group is at least one cell group of the K cell groups, and deactivate a serving cell in the to-be-deactivated cell group according to the cell group deactivation message.

In a sixth optional implementation solution, when communicating with the base station according to the K cell groups, the processor 41 is further configured to receive, using the transceiver 42, a cell group deactivation message sent by the base station, where the cell group deactivation message is used to indicate a to-be-deactivated cell group and a to-be-deactivated serving cell in the to-be-deactivated cell group, the to-be-deactivated cell group is at least one cell group of the K cell groups, and the to-be-deactivated serving cell is at least one serving cell in the cell group to which the to-be-deactivated serving cell belongs, and deactivate a to-be-deactivated serving cell in the to-be-deactivated cell group according to the cell group deactivation message.

In a seventh optional implementation solution, when communicating with the base station according to the K cell groups, the processor 41 is further configured to send a CQI or feedback information of at least one downlink channel to the base station using an uplink channel used to carry a PUCCH and using the transceiver 42, where a serving cell corresponding to the uplink channel used to carry the PUCCH and a serving cell corresponding to the at least one downlink channel belong to a same cell group, and the feedback information includes ACK information or NACK information.

Optionally, when the N serving cells are grouped into a licensed carrier cell group and an unlicensed carrier cell group, a carrier used in a serving cell included in the licensed carrier cell is a licensed carrier, and a carrier used in a serving cell included in the unlicensed carrier cell is an unlicensed carrier, and when communicating with the base station according to the K cell groups, the processor 41 is further configured to communicate with the base station according to a DRX working mode using a serving cell in the licensed carrier cell group, or communicate with the base station according to a working mode in which DRX is not configured and using a serving cell in the unlicensed carrier cell group.

In an eighth optional implementation solution, when communicating with the base station according to the K cell groups, the processor 41 is further configured to communicate with the base station using a first cell group and according to a DRX configuration corresponding to a same DRX configuration parameter of serving cells in the first cell group, where the first cell group is any cell group of the K cell groups, and the DRX configuration parameter includes at least one of DRX duration, a DRX inactivity timer, a DRX retransmission timer, a long DRX cycle offset, a short DRX cycle, or a DRX short cycle.

In a ninth optional implementation solution, when communicating with the base station according to the K cell groups, the processor 41 is further configured to send NACK information to the base station using the transceiver 42 when the UE has not successfully received downlink data sent by the base station using a first serving cell, where the NACK information indicates that the UE has not successfully received the downlink data, and the first serving cell is any serving cell of the N serving cells, and receive, using a second serving cell and using the transceiver 42, the downlink data sent by the base station.

In a tenth optional implementation solution, when communicating with the base station according to the K cell groups, the processor 41 is further configured to send uplink data to the base station using a first serving cell and using the transceiver 42, where the first serving cell is any serving cell of the N serving cells, receive NACK information sent by the base station, where the NACK information is used to indicate that the base station has not successfully received the uplink data, and send the uplink data to the base station using a second serving cell and using the transceiver 42.

In an eleventh optional implementation solution, when communicating with the base station according to the K cell groups, the processor 41 is further configured to receive, using a first serving cell and using the transceiver 42, DCI sent by the base station, where the first serving cell is any serving cell of the N serving cells, the DCI is used to instruct the UE to communicate with the base station using a second serving cell, and the first serving cell and the second serving cell belong to a same cell group, and communicate with the base station according to the DCI using the second serving cell.

In a twelfth optional implementation solution, when communicating with the base station according to the K cell groups, the processor 41 is further configured to perform communication link quality detection on communication links of M serving cells in a first cell group, to obtain communication link quality detection results of the M serving cells, where M is a positive integer less than a quantity of serving cells in the first cell group, and the first cell group is any cell group of the K cell groups, and send the communication link quality detection results of the M serving cells to the base station using the transceiver 42.

Optionally, the communication link quality detection includes, but is not limited to, at least one of the following: whether a downlink channel is out-of-synchronization, whether an uplink channel is out-of-synchronization, an SINR of an uplink channel, or a radio link failure.

In a thirteenth optional implementation solution, before performing communication link quality detection on the communication links of the M serving cells in the first cell group, the processor 41 is further configured to receive, using the transceiver 42, communication link quality detection instruction information sent by the base station, where the communication link quality detection instruction information is used to instruct the UE to perform communication link quality detection on the communication links of the M serving cells in the first cell group, and when performing communication link quality detection on the communication links of the M serving cells in the first cell group, to obtain the communication link quality detection results of the M serving cells, the processor 41 is further configured to perform communication link quality detection on the communication links of the M serving cells in the first cell group according to the communication link quality detection instruction information, to obtain the communication link quality detection results of the M serving cells.

In a fourteenth optional implementation solution, when communicating with the base station according to the K cell groups, the processor 41 is further configured to receive, using the transceiver 42, information about M random access channels that is sent by the base station, where the M random access channels are respectively random access channels between the UE and M serving cells in a first cell group, the first cell group is any cell group of the K cell groups, and M is a positive integer not greater than a quantity of serving cells in the first cell group, send a preamble to the base station on a first random access channel according to information about the first random access channel using the transceiver 42, where the first random access channel is any random access channel of the M random access channels, and receive, using a first serving cell and using the transceiver 42, a random access response that corresponds to the first random access channel and that is sent by the base station, where the first serving cell is any serving cell in the first cell group.

Optionally, the random access response includes uplink scheduling grant information, the uplink scheduling grant information is used to instruct the UE to send uplink information in a second serving cell, and the second serving cell and the first serving cell belong to a same cell group, and the processor 41 is further configured to send the uplink information to the base station according to the uplink scheduling grant information using the second serving cell and the transceiver 42.

In a fifteenth optional implementation solution, when communicating with the base station according to the K cell groups, the processor 41 is further configured to obtain signal quality of a primary serving cell in the K cell groups and a neighboring cell of the UE, where the primary serving cell is a serving cell that transmits control signaling and that is in a cell group to which the primary serving cell belongs, determine that the UE triggers, in a first cell group, a first measurement event to occur, according to signal quality of a primary serving cell in the first cell group, the signal quality of the neighboring cell of the UE, and a condition that is satisfied so that a measurement event occurs, where triggering the first measurement event to occur includes triggering to enter the first measurement event or triggering to leave the first measurement event, and the first measurement event is any one of measurement events, and when triggering, by the UE in the first cell group, the first measurement event to occur is triggering to enter the first measurement event, send a measurement report to the base station using the transceiver 42, where the measurement report is used to indicate that the UE triggers, in the first cell group, to enter the first measurement event.

The UE in this embodiment may be configured to execute the technical solutions executed by UE in the foregoing method embodiments of the present disclosure. An implementation principle and a technical effect thereof are similar, and details are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A communications method for multi-carrier aggregation, comprising:
    receiving, by a user equipment (UE), a cell grouping message from a base station, wherein the cell grouping message indicates that N serving cells are grouped into K cell groups, wherein N is an integer greater than zero K is an integer less than N, wherein the N serving cells are grouped into a licensed carrier cell group and an unlicensed carrier cell group, wherein a carrier used in a serving cell comprised in the licensed carrier cell group is a licensed carrier, and wherein a carrier used in a serving cell comprised in the unlicensed carrier cell group is an unlicensed carrier;
    communicating, by the UE, with the base station according to the K cell groups; and
    receiving, by the UE from the base station, one piece of management signaling per cell group of the K cell groups.

2. The method of claim 1, wherein the cell grouping message comprises identifiers of the K cell groups and identifiers of the N serving cells and indicates respective identifiers of the N serving cells that correspond to respective identifiers of the K cell groups.

3. The method of claim 1, wherein communicating with the base station comprises:
    receiving, by the UE, a cell group modification message from the base station, wherein the cell group modification message comprises an identifier of a to-be-modified cell group and an identifier of a serving cell comprised in a modified cell group, and wherein the to-be-modified cell group is at least one cell group of the K cell groups; and updating, by the UE, the to-be-modified cell group according to the cell group modification message.

4. The method of claim 1, wherein communicating with the base station comprises:

receiving, by the UE, a cell group release message from the base station, wherein the cell group release message comprises an identifier of a to-be-released cell group, and wherein the to-be-released cell group is at least one cell group of the K cell groups; and releasing, by the UE, a serving cell in the to-be-released cell group according to the cell group release message.

5. The method of claim 1, wherein communicating with the base station comprises:

receiving, by the UE, a cell group activation message from the base station, wherein the cell group activation message indicates a to-be-activated cell group, and wherein the to-be-activated cell group is at least one cell group of the K cell groups; and activating, by the UE, a serving cell in the to-be-activated cell group according to the cell group activation message.

6. The method of claim 1, wherein communicating with the base station comprises:

receiving, by the UE, a cell group deactivation message from the base station, wherein the cell group deactivation message indicates a to-be-deactivated cell group, and wherein the to-be-deactivated cell group is at least one cell group of the K cell groups; and deactivating, by the UE, a serving cell in the to-be-deactivated cell group according to the cell group deactivation message.

7. The method of claim 1, wherein communicating with the base station comprises:

communicating, by the UE, with the base station according to a discontinuous reception (DRX) working mode using a serving cell in the licensed carrier cell group; or communicating, by the UE with the base station using a serving cell in the unlicensed carrier cell group, according to a working mode in which DRX is not configured.

8. A base station for multi-carrier aggregation, the base station comprising:

a processor configured to group N serving cells into K cell groups, wherein N is a positive integer greater than one, and wherein K is a positive integer less than N; and a transceiver coupled to the processor and configured to send to a user equipment (UE):

a cell grouping message that indicates that the N serving cells are grouped into the K cell groups; and one piece of management signaling per cell group of the K cell groups, wherein the processor is further configured to:

communicate with the UE according to the K cell groups; and group the N serving cells into the K cell groups at least in part by grouping the N serving cells into a licensed carrier cell group or an unlicensed carrier cell group according to types of carriers used in the N serving cells, wherein a carrier used in a serving cell comprised in the licensed carrier cell group is a licensed carrier, and wherein a carrier used in a serving cell comprised in the unlicensed carrier cell group is an unlicensed carrier.

9. The base station of claim 8, wherein the cell grouping message comprises identifiers of the K cell groups and identifiers of the N serving cells and indicates respective identifiers of the N serving cells that correspond to respective identifiers of the K cell groups.

10. The base station of claim 8, wherein the processor is configured to communicate with the UE at least in part by being configured to send a cell group modification message to the UE, wherein the cell group modification message comprises an identifier of a to-be-modified cell group and an identifier of a cell comprised in a modified cell group, and wherein the to-be-modified cell group is at least one cell group of the K cell groups.

11. The base station of claim 8, wherein the processor is configured to communicate with the UE at least in part by being configured to send a cell group release message to the UE, wherein the cell group release message comprises an identifier of a to-be-released cell group, and wherein the to-be-released cell group is at least one cell group of the K cell groups.

12. The base station of claim 8, wherein the processor is configured to communicate with the UE at least in part by being configured to send a cell group activation message to the UE, wherein the cell group activation message indicates a to-be-activated cell group, and wherein the to-be-activated cell group is at least one cell group of the K cell groups.

13. A user equipment (UE) for multi-carrier aggregation, the UE comprising:

a transceiver configured to receive from a base station:

a cell grouping message that indicates that N serving cells are grouped into K cell groups, wherein N is an integer greater than zero K is an integer less than N, wherein the N serving cells are grouped into a licensed carrier cell group and an unlicensed carrier cell group, wherein a carrier used in a serving cell comprised in the licensed carrier cell group is a licensed carrier, and wherein a carrier used in a serving cell comprised in the unlicensed carrier cell group is an unlicensed carrier; and one piece of management signaling per cell group of the K cell groups; and a processor coupled to the transceiver and configured to communicate with the base station according to the K cell groups.

14. The UE according to claim 13, wherein the cell grouping message comprises identifiers of the K cell groups and identifiers of the N serving cells and indicates respective identifiers of the N serving cells that correspond to respective identifiers of the K cell groups.

15. The UE of claim 13, wherein the processor is configured to communicate with the base station at least in part by being configured to:

receive a cell group modification message from the base station, wherein the cell group modification message comprises an identifier of a to-be-modified cell group and an identifier of a serving cell comprised in a modified cell group, and wherein the to-be-modified cell group is at least one cell group of the K cell groups; and update the to-be-modified cell group according to the cell group modification message.

16. The UE of claim 13, wherein the processor is configured to communicate with the base station at least in part by being configured to:

receive a cell group release message from the base station, wherein the cell group release message comprises an identifier of a to-be-released cell group, and wherein the to-be-released cell group is at least one cell group of the K cell groups; and release a serving cell in the to-be-released cell group according to the cell group release message.

17. The UE of claim 13, wherein the processor is configured to communicate with the base station at least in part by being configured to:
receive a cell group activation message from the base station, wherein the cell group activation message indicates a to-be-activated cell group, and wherein the to-be-activated cell group is at least one cell group of the K cell groups; and
activate a serving cell in the to-be-activated cell group according to the cell group activation message.

18. The UE of claim 13, wherein when communicating with the base station, the processor is further configured to:
receive a cell group deactivation message from the base station, wherein the cell group deactivation message indicates a to-be-deactivated cell group, and wherein the to-be-deactivated cell group is at least one cell group of the K cell groups; and
deactivate a serving cell in the to-be-deactivated cell group according to the cell group deactivation message.

19. The UE of claim 13, wherein the processor is configured to:
communicate with the base station according to a discontinuous reception (DRX) working mode using a serving cell in the licensed carrier cell group; or
communicate with the base station using a serving cell in the unlicensed carrier cell group and according to a working mode in which DRX is not configured.

* * * * *